Inventor:

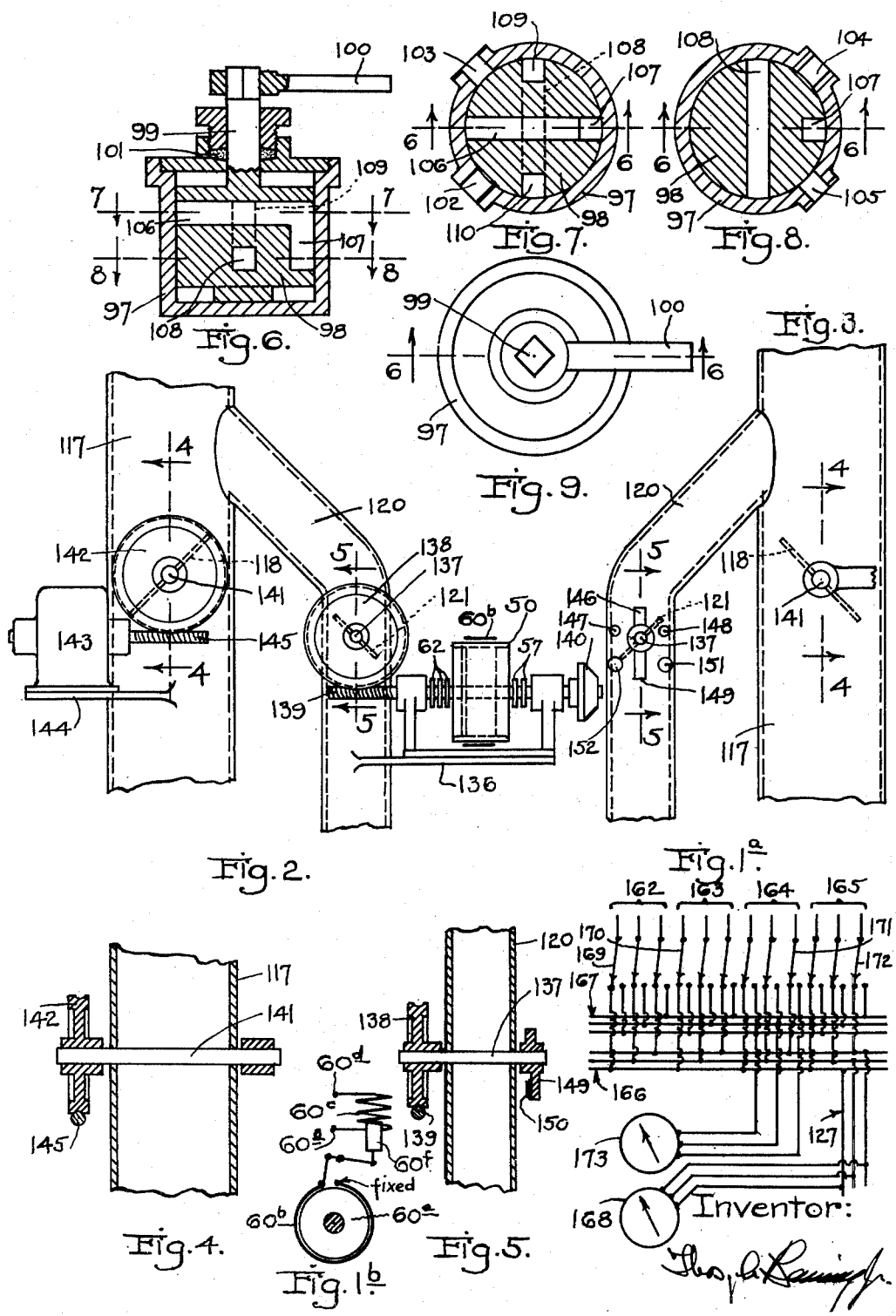

Oct. 7, 1952     T. A. BANNING, JR     2,612,956
SYNCHRONIZING MEANS FOR MULTIMOTORED AIRPLANES
Filed Sept. 22, 1942     7 Sheets-Sheet 3
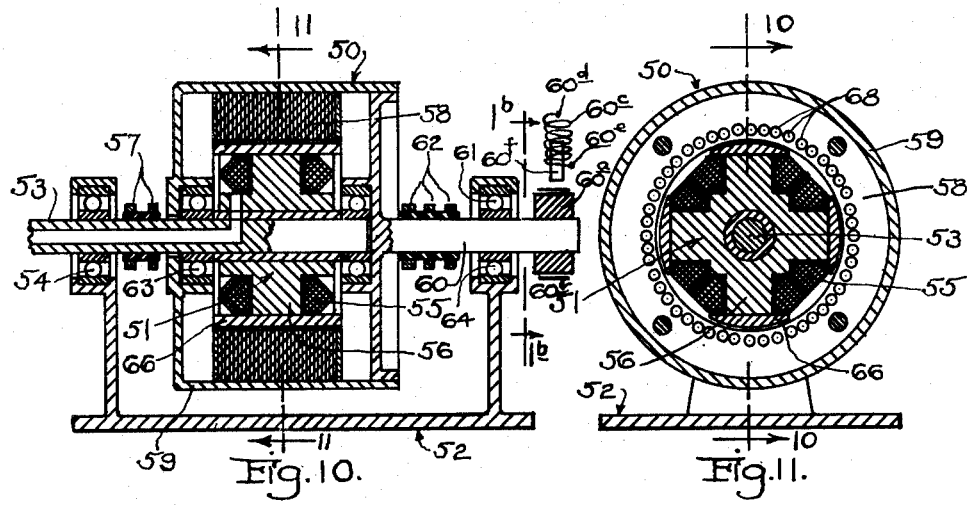
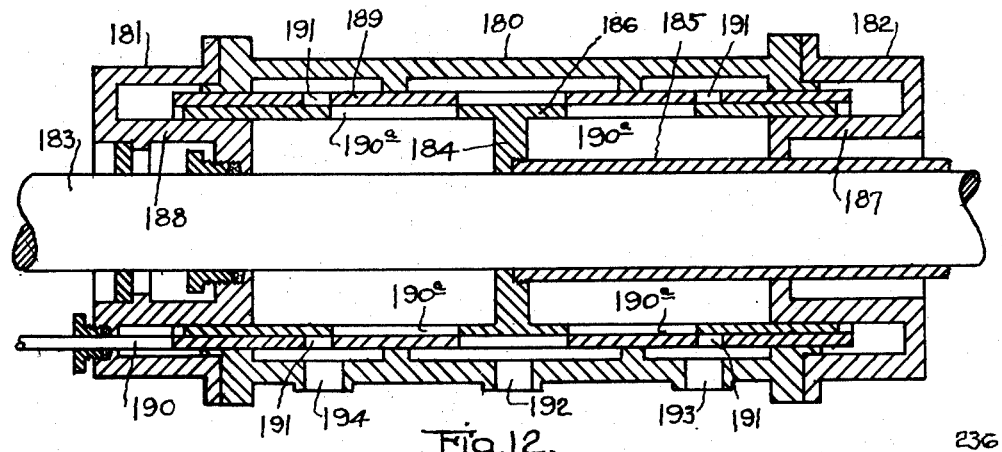
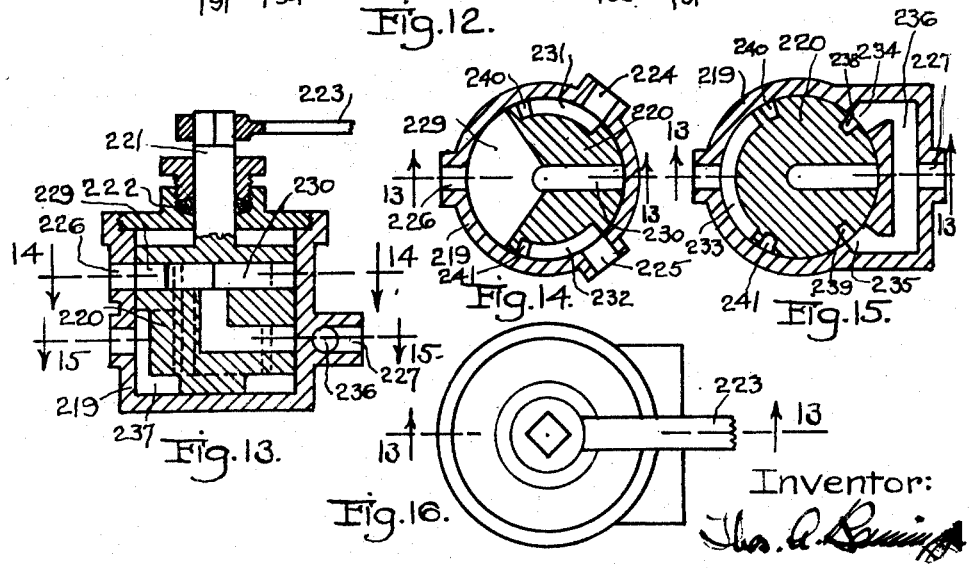
Inventor:

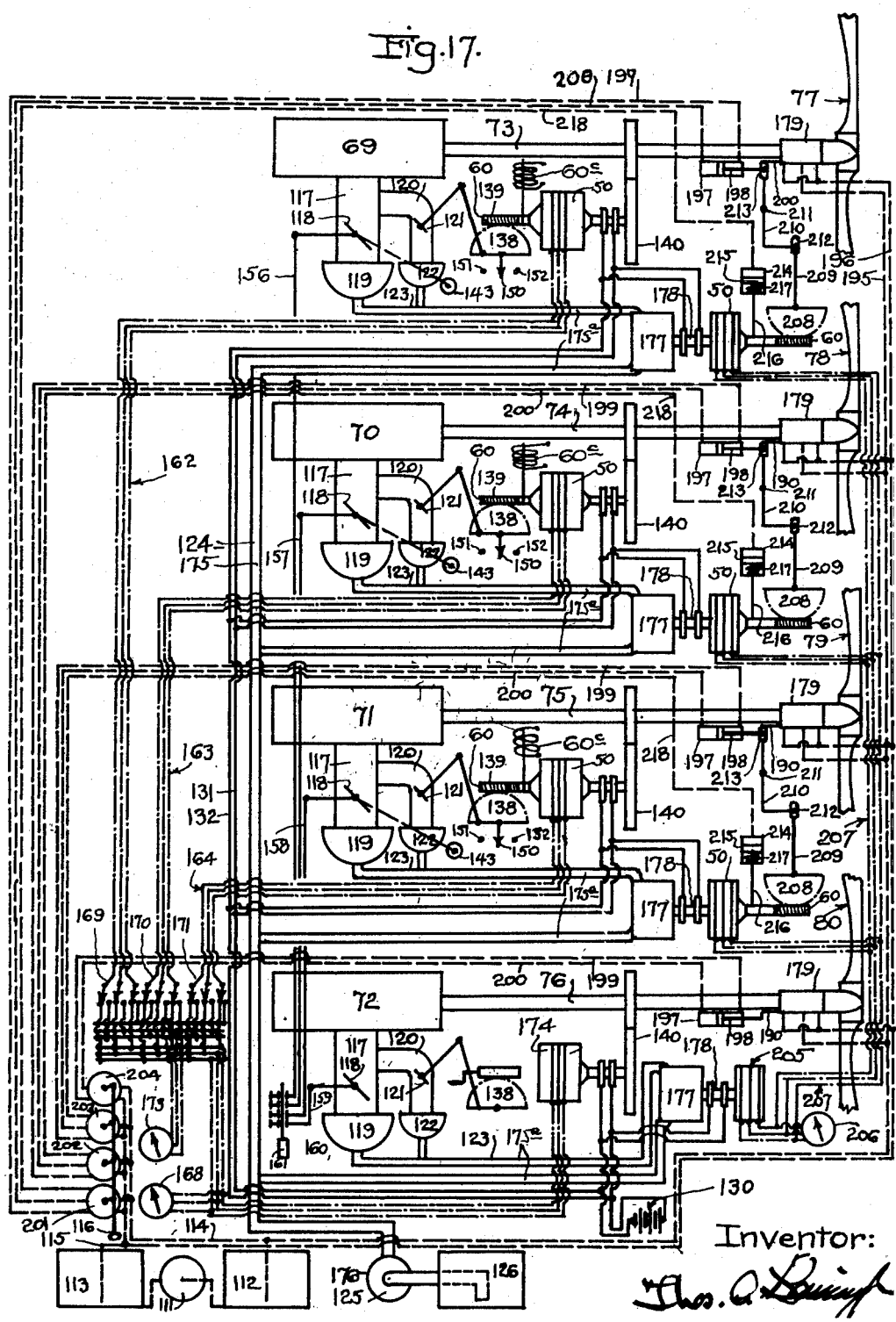

Oct. 7, 1952     T. A. BANNING, JR     2,612,956

SYNCHRONIZING MEANS FOR MULTIMOTORED AIRPLANES

Filed Sept. 22, 1942     7 Sheets-Sheet 7

Fig.20.

Patented Oct. 7, 1952

2,612,956

UNITED STATES PATENT OFFICE 2,612,956

SYNCHRONIZING MEANS FOR MULTI-MOTORED AIRPLANES

Thomas A. Banning, Jr., Chicago, Ill.

Application September 22, 1942, Serial No. 459,336

25 Claims. (Cl. 170—135.29)

This invention concerns itself with control of multi-motored airplanes, especially control of the speed, power, pitch of propeller blades, and other functions related thereto. While the features herein disclosed have been devised especially with reference to the conditions existing in multi-motored airplanes, it will be evident hereinafter that many of said features are also useful in connection with other multi-motored vehicles or installations, such as motor boats; but since I have devised the present improvements with especial reference to airplane installations, and since I have herein illustrated my improvements as applied to an airplane installation I shall make especial reference to such installations, but in so doing I wish it understood that I do not thereby intend to limit myself, except as I may do so in the claims to follow.

The power generated by each airplane motor is delivered to its individual propeller, and the useful work thereof is to be absorbed by such propeller. Such power is represented by the product of angular velocity multiplied by torque; and of course the angular velocity is a direct function of speed in R. P. M. The torque absorbed by the propeller at any given speed condition will depend on the pitch setting of the blades of such propeller; and in general said torque may be varied between substantially zero and a maximum for the installation by pitch adjustment. It is, of course understood that many factors affect the torque absorbed for any given pitch setting, such as atmospheric pressure (changing with elevation above sea-level), amount of contained moisture (with respect to dew point), and other factors. Still, for any selected condition the torque absorbed will be controllable by pitch control; so, likewise, for a given power input to the propeller (delivery by the motor), change of speed must be accompanied by change of pitch; or, conversely, for a given speed condition, change of power must be accompanied by change of pitch.

Each motor of a multi-motored airplane requires control of its gas supply, its speed, and its pitch of propeller (in addition to various other controls affecting its operation), but the three factors just enumerated may be grouped together for relative functioning. It is very desirable to so control the several motors that normally they will rotate at the same speed (assuming they are all of the same size and characteristic). When the plane is in normal operation this condition is represented by synchronizing of the speed of the several motors, and such synchronizing is very desirable for various reasons. In some cases it is also desirable to so control the various propellers that their pitches are substantially the same during normal functioning of the plane, assuming that all the propellers are taking the same "bite" on the air; and under these conditions the powers being delivered by the several motors will also be synchronized. Thus we find that under certain normal operating conditions it is desirable to sychronize both speed and power of the several motors.

There arise frequently, however, conditions under which synchronization of power (pitch) is not required or even desirable, while nevertheless it remains desirable to synchronize speed. For example, in the case of a special maneuver, such as a power dive, it may be very desirable to maintain the motors in synchronized speed, but still to be able to individually control their several torques. In this connection, also, it is extremely desirable to have assurance that at all times during such maneuver all the motors will remain functioning normally, so that when the pilot suddenly makes a demand on the motors for power they will all be functioning normally, and will not fail him at a critical instant.

One principal object of the present invention is to provide means for synchronizing the speeds of the motors, either with or without synchronization of motor powers. In connection with the synchronization of motor speeds it is a further object of the invention to make provision for maintaining such synchronization very accurately, so that all motors will always function at substantially the same speed. It is a further object in this connection to make provision for securing such synchronization over a wide range of motor speeds, as may be selected by the pilot.

Sometimes the synchronization may be attained by use of one of the motors as a "pilot" motor, making provision for bringing the speeds of the remaining motors into synchronism therewith; but generally, and preferably it is desirable to provide a "pilot" line or frequency with which all the motors are synchronized, thereby eliminating the possibility of throwing the entire synchronizing plan out of function in case of disabling of the "pilot" motor. I have herein disclosed means for securing the synchronizing in either of these ways.

A further object in connection with the foregoing is to make provision for manual control of the synchronizing speed, so that the pilot of the plane may set his speed control to the speed which he may select, whereupon all the motors will be brought and held severely and very accurately at that speed, and whereby any departure of any motor from that speed will be immediately corrected automatically by the synchronizing apparatus, and the speed of such motor will be again held at the selected speed, as predetermined by the pilot. In this connection, also, it is an object to provide visual indicating means to show the pilot the speed for which he has set his control mechanism.

In connection with the foregoing it is an object of the invention to make provision for simultaneously controlling all the motors as respect speed, so that the pilot may, by a simple setting of a single control element, ensure synchronization of all the motors at the selected speed. Thereby the work imposed on the pilot is reduced to a minimum, and he has merely to manipulate a single control, and has merely to watch a single instrument or indicator, to know that all the motors have been brought to the selected speed, and will be rigidly held at such speed automatically, and without further thought or operation on his part.

It is a further object of the invention to make provision for quickly disconnecting any selected motor from the synchronizing means, so that at any time the pilot may cut out any motor from the automatic synchronizing control, and thereafter treat such motor specially as to speed, or cut it out of service entirely; and also to enable cutting out such motor from the synchronizing system in case of damage to such motor or otherwise. Also, in such case to make provision for enabling the pilot to continue individual operation of such motor if possible, and if desired. In this connection it is also an object of the invention to make provision for manual control of any or all motors in case of damage to the synchronizing means, so that in such case the control of the power plant of the plane manually may be continued indefinitely.

Generally the speed control means will function on the motor throttles, opening and closing them, or rather adjusting them from time to time, or continuously under functioning of the synchronizing mechanism. In the case of large power plants, say of one thousand horse-power and upwards per motor, it may be found desirable to secure close synchronizing trimming by use of a small throttle, operating in conjunction with the main throttle, and such small throttle being of sufficient size to make adjustments from time to time or continuously to maintain synchronism under normally expected ranges of adjustment required. The synchronizing means acts then on such trimming throttle, the main throttle remaining undisturbed. Still, in case of the arising of a condition requiring a greater change of gas flow than can be handled by such small trimming throttle, it becomes necessary to readjust the main throttle in order to maintain the condition of synchronism selected. I have therefore, and as a further object of the invention, made provision for ensuring automatic change or readjustment of the main throttle, in conjunction with abnormally large changes of requirement, in order to maintain the condition of synchronism. It is a further object of the invention to ensure proper functioning of both throttles of each motor at all times, and irrespective of whether the power requirement is one of increase or decrease as called for.

In connection with the foregoing, it is a further object of the invention to provide a manual control for the throttle of each motor, so that in case of desirability such throttle may be manually adjusted. In this connection it is a further object to provide a "gang" control for the throttles of all motors, so that if desired all motor throttles may be simultaneously manually controlled, as for example, in case of disabling the automatic synchronizing control. In this connection, also, it is an object to make provision for very simply disconnecting any selected motor throttle, or all motor throttles from such gang control, so that such motor may be individually controlled manually, or so that such motor may be placed under the jurisdiction of the automatic synchronizing control.

Sometimes it may be found desirable to control the speed of the motors by control of propeller blade pitches. For example, in case of provision of a power control device (as hereinafter disclosed) in connection with each motor, which power control device operates directly on the throttles of the motors, it may become desirable to control speed by controlling pitch, leaving the power undisturbed. I have therefore, as a further object of my present invention, made provision for speed control by control of pitch of blades, securing the condition of synchronism by suitable pitch control automatically. In this connection I have also made provision for cutting out the several speed controls for the several motors, and for manual control of the pitches of the several propellers, if desired.

In connection with the foregoing it is a further object of the invention to make provision for either individual or gang control of the pitches of the several motor propellers, manually, as desired.

Generally the power required for pitch control of the propeller blades will be excessive for direct manual operation, and it is desirable for the arrangement to include power operation of the blade shifting means. I have herein disclosed such power blade operation, preferably by oil or other fluid under pressure; and I have provided, as a further object of the invention, means for ensuring such power or servo-motor means operation, either automatically or manually controlled, as selected. In either case, however, the power directly applied to the blade shifting mechanism is provided by the oil or other fluid under pressure.

When it is desired to measure motor power, being the product of speed and torque, such measure may be effected either by means to multiply these functions, or otherwise. I have ascertained that the rate of fuel flow to a motor, operating under normal conditions of power requirement, is an accurate measure of the power being momentarily delivered by such motor. Thus, in the case of a gasoline motor, especially of the large sizes being used for airplane operations, say of upwards of one thousand horse-power, the rate of gas consumption of such motor, when operating under normal loading conditions, is an accurate measure of the power being delivered by such motor. In this connection, of course proper account must be taken of the B. t. u. of the fuel being used, the condition of the motor, and other factors; but nevertheless, such rate of fuel flow is a measure of the power being delivered, insofar as concerns relative operation of such motor in comparison to other motors of the same group. This is especially true in the case of a plane wherein all the motors are being supplied from fuel from the same supply tank or line. I have therefore ascertained that in case it is desirable to measure motor power such measurement may be effected by use of a suitably calibrated meter placed in the fuel supply line of such motor, the rate of shaft rotation of such meter being a measure of rate of fuel consumption, and therefore also a measure of power being generated.

It is therefore a further object of the present invention to make provision for control of motor power by suitable control of throttle or propeller pitch, based on rate of fuel consumption; and also is a further object to, if desired, synchronize all motors of the series, as respects their several power deliveries, by use of suitable controls of throttle and propeller pitches.

When it is desirable to synchronize or control power, such control may be effected by varying the propeller pitches, in case the control of throttles is to be reserved for control of speed; or by control of throttles, in case the control of propeller pitches is to be reserved for speed. Thus, it is a further object of my present invention to, if desired, synchronize or control both speed and power of each motor of the series, by suitable controls of both the throttles and the propeller pitches.

In connection with the foregoing, I have also made provision for indicating to the pilot of the plane the power being delivered, or the power which he determines shall be delivered, by each motor, so that he may set his control device for power, and have assurance that each motor will be brought to the selected condition of operation as so pre-determined.

Generally conditions of speed will be controlled by control of throttle setting, and conditions of power will be controlled by adjustment of blade pitches. I have therefore, in one form of my invention made provision for synchronizing speed automatically, by control of throttles, and for synchronizing of powers of the motors by control of blade settings; and in a further or modified form of my invention I have made provision for synchronizing of motor speeds by control of propeller blade pitches, and for control of motor powers for synchronization by control of throttles. Still, in a simple embodiment of certain features of my present invention I have made provision for synchronization merely of motor speeds, by automatic controls of the several throttles.

In order to secure the condition of synchronism as between the motor speed and the pre-selected speed (as pre-determined by the pilot), it is necessary to provide a means for securing proper comparison of the momentary motor speed with the pre-selected speed, and if there be any difference between these two, for making proper compensation or adjustment of the proper element, either the throttle or the blade pitch, as required; and furthermore, it is necessary to make provision for ensuring continuous automatic functioning of the throttle or the blade pitch, as required, based on such comparison, and without attention by or thought of the pilot. It is a further object of the present invention to provide such synchronizing means, and to effect proper connection thereof to the elements to be compared, and to be controlled. Furthermore it is necessary that such synchronizing element be so constituted that it will function continuously, and with sufficient force or effort to ensure the proper functioning of the throttle or the blade pitch adjustment means, as the case may be; so that not only will accurate and continuous synchronous control be effected, but also so that the proper power may at all times be available to ensure that proper correction will be effected in the throttle or pitch operating means.

It is an important object of my present invention to provide a synchronizing device which will admirably meet all the foregoing requirements, as well as others, as will presently appear hereinafter. It is a further object of the invention to provide such synchronizing device in the form of a synchronous motor element of very simple construction and design, and one which is very rugged and well adapted to meet rigorous operating conditions. Such synchronous synchronizing element operates in conjunction with a polyphase control circuit, the frequency of which circuit is subject to control by the pilot, so that by adjusting the frequency of such circuit he thereby adjusts also the synchronous frequency of the control element and any departure of the speed of the motor, or of the fuel meter, from such adjusted frequency will immediately ensure operation of the synchronously operating element to ensure correction of the setting of the throttle (or of the blade pitch) to bring about the needed compensation and restore the condition of synchronism.

In connection with the foregoing it is a further object of the invention to provide a very simple form of synchronizing element, one which is very rugged in construction, one which can be built of sufficient power to ensure proper functioning of the necessary elements, and one which can be built to a high degree of standardization, and of a very accurate operation.

In connection with the foregoing, it is a further object of the invention, when both power and speed are to be controlled automatically, to make use of the same construction of synchronizing element for both functions, so as to reduce the number of standards of elements which will be required for a complete installation. In this connection, generally each of these synchronizing elements will be of relatively small size, for example, two hundred watts, but it may be very ruggedly built, and well adapted to meet very arduous conditions of operation in service.

Other objects and uses of the invention will appear from a detailed description of the same, which consists in the features of construction, and combinations of parts hereinafter described and claimed.

In the drawings:

Figure 1 shows a schematic diagram or layout for a four motor installation, being a four propeller installation, in which speed control only is automatically effected, for synchronization to a control or pilot circuit, under control of the plane pilot, the synchronous control for each motor operating on a trimming throttle for such motor, the main throttle of such motor being also properly connected and controlled so that it will function automatically to take care of variations of demand larger than can be accommodated by the trimming throttle alone; there being provided also manual controls for the several main throttles, either individually or in gang, and there being provided also manual control for the pitches of the several propeller blades by oil under pressure, such blade controls being either in gang or individually as desired; suitable indicating instruments being provided for the several functions;

Figure 2 shows, more or less schematically, a side elevation of the gas supply manifolds, both main and trimming, for one motor, showing the synchronous element for control of the trimming throttle, and the control motor for control of the main throttle;

Figure 3 shows a view similar to that of Figure 2, but looking at the back sides of the parts;

Figure 4 shows a section on the line 4—4 of

Figure 1:
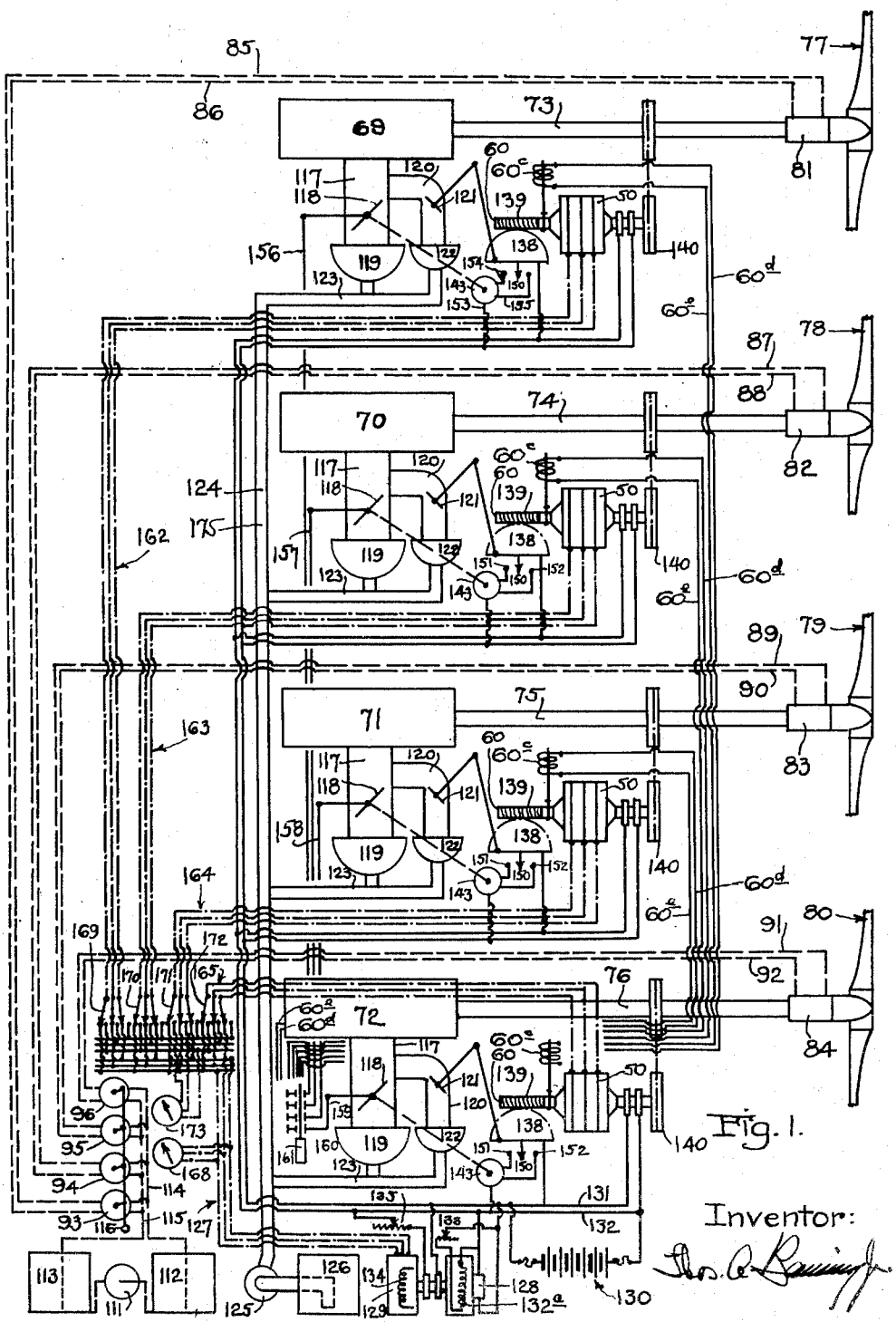
Figure 18:
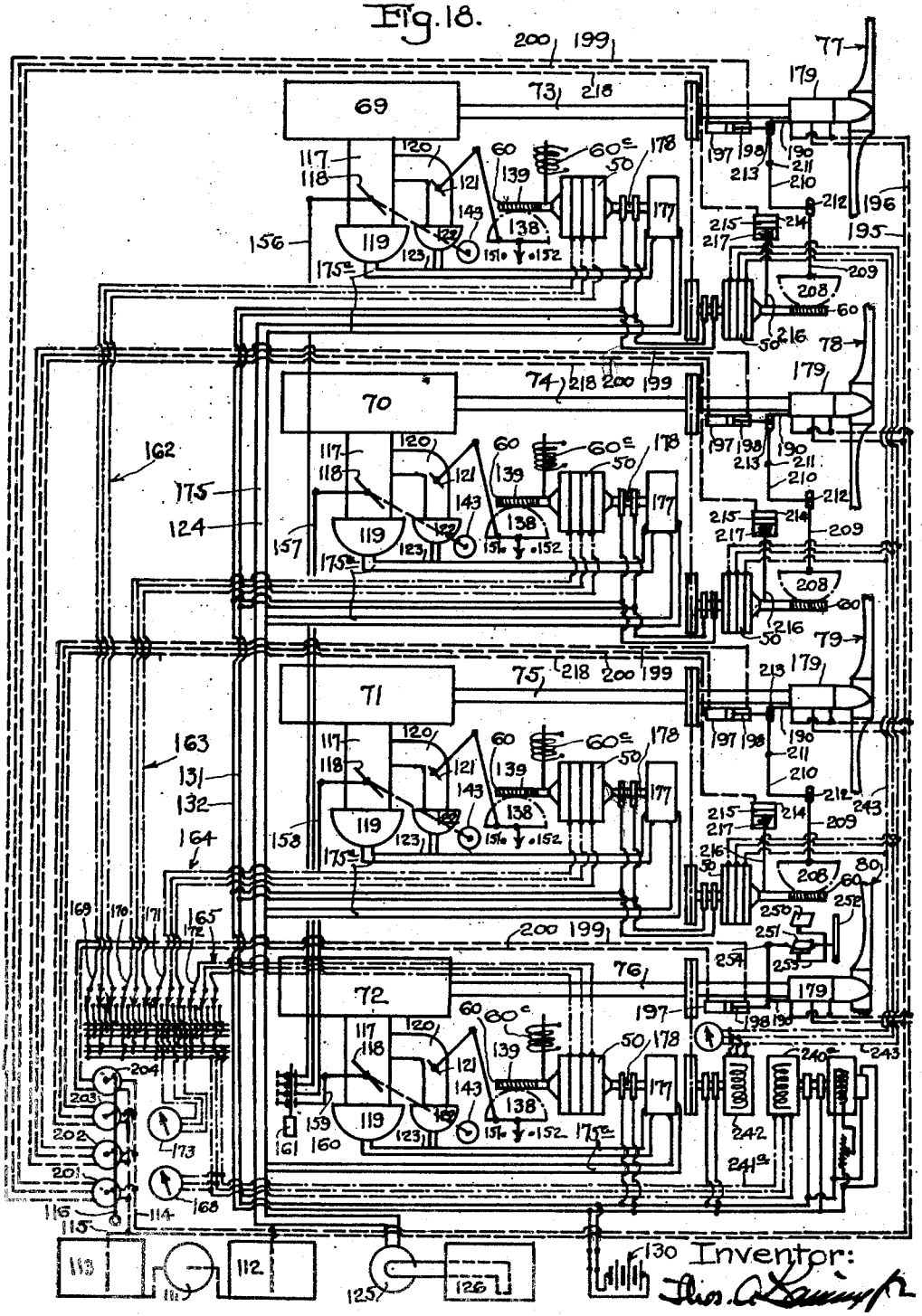
Figure 19:
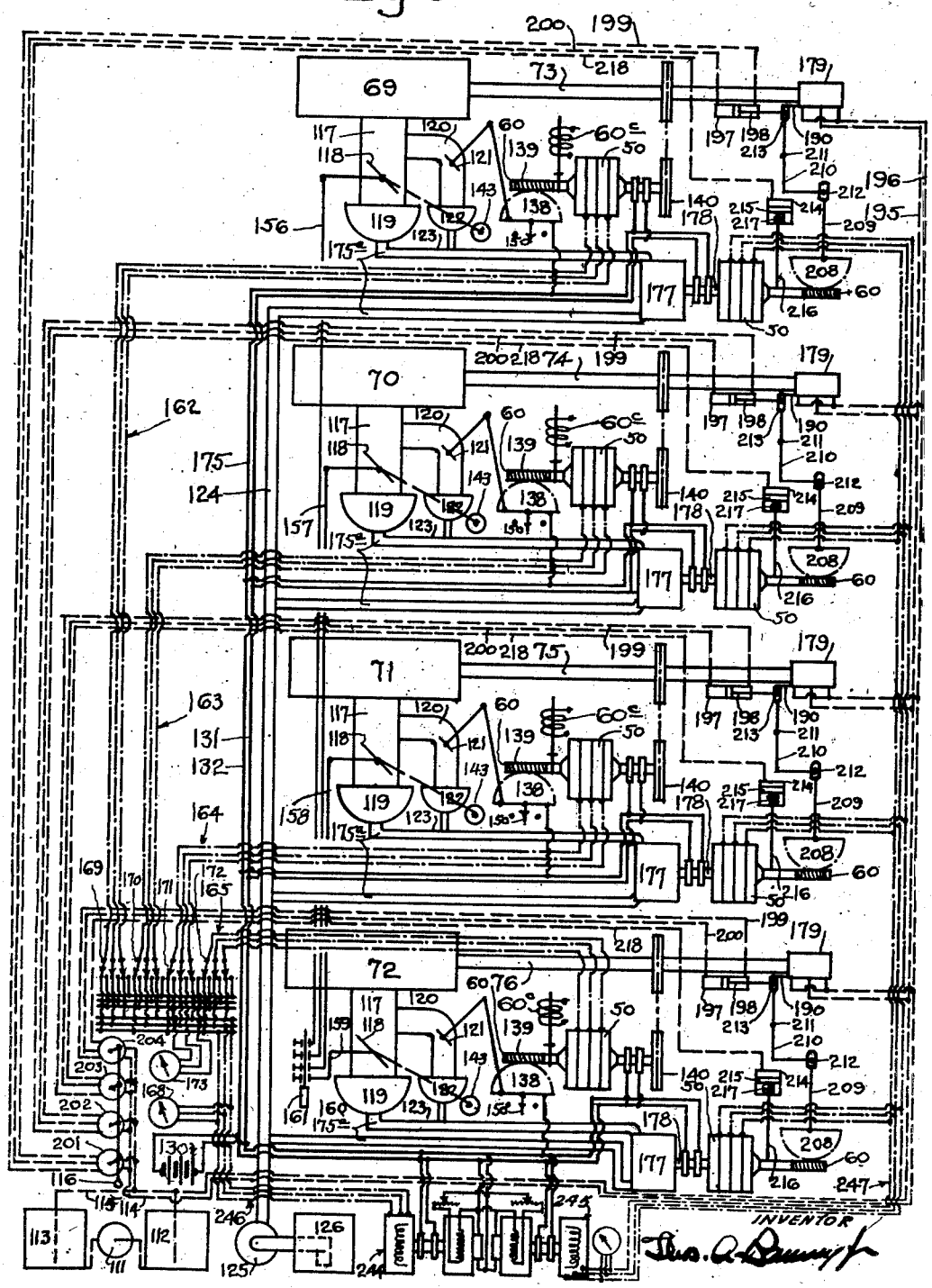

Figures 2 and 3, looking in the directions of the arrows;

Figure 5 shows a section on the line 5—5 of Figures 2 and 3, looking in the directions of the arrows;

Figure 6 shows a vertical section through a typical control valve for control of oil supply to one of the blade shifting elements of one of the propellers, enabling shifting thereof in either direction by manual control, and enabling oil locking of such blade shifting element at any selected setting thereof;

Figure 7 shows a horizontal section on the line 7—7 of Figure 6, looking in the direction of the arrows, showing the oil delivery ports, and the corresponding plug passages;

Figure 8 shows a horizontal section on the line 8—8 of Figure 6, looking in the direction of the arrows, showing the oil supply ports, and the corresponding plug passages;

Figure 9 shows a plan view corresponding to Figures 6, 7 and 8;

Figure 10 shows a longitudinal vertical section through a synchronizing element, embodying certain of the features of the present invention, incorporating a three phase rotating field element and being a section on the line 10—10 of Figure 11, looking in the direction of the arrows;

Figure 11 shows a cross-section on the line 11—11 of Figure 10, looking in the direction of the arrows;

Figure 12 shows a longitudinal section through an oil pressure servo-motor suitable for power operating the blade adjusting mechanisms of the propeller, being provided with a valve which, when moved to a given position, ensures corresponding movement and stoppage of the power element of such servo-motor at the pre-selected point to place and hold the blades at such pre-selected position; such servo-motor being suitable for use in connection with certain embodiments of the present invention;

Figure 13 shows a vertical section through another form of oil valve for use in connection with the control of the oil pressure operated blade shifting elements when using certain embodiments of my present invention;

Figure 14 shows a horizontal section on the line 14—14 of Figure 13, looking in the direction of the arrows;

Figure 15 shows a horizontal section on the line 15—15 of Figure 13, looking in the direction of the arrows;

Figure 16 shows a plan view of the valve of Figures 13, 14 and 15;

Figure 17 shows a schematic diagram or layout similar to that of Figure 1, but incorporating speed control for the several motors based on use of one of the motors as a "control" or "pilot" motor; same being manually controlled, and the other motors being brought to the same speed as that of such control motor; speed being controlled by throttle controls; and this layout also includes control of the pitches of the blades of such "control" or "pilot" motor manually; and automatic control of the pitches of the blades of the other motors according to power, so that the power being delivered by such "control" or "pilot" motor determines the powers which will be delivered by the other motors; regulation thereof being by control of pitches of their blades;

Figure 18 shows a schematic layout or diagram similar to that of Figure 17; but in the present case use is made of a "pilot" circuit for control of powers of all the motors, the speed of one motor being a "control" or "pilot" motor being controlled by pitch adjustment thereof manually, and serving to control the speeds of the other motors by control of the pitches of their blades;

Figure 19 shows a schematic diagram or layout similar to those previously explained, but in the present case there are provided two "pilot" polyphase circuits, the frequencies of which can be manually controlled by the pilot of the plane; one of these circuits being for determination of motor speeds, and the other being for determination of motor powers; the speeds of all motors being brought into synchronism with the speed control circuit by throttle controls, and the powers of all motors being brought into synchronism with the power control circuit by blade adjustments; and Figure 20 shows a schematic diagram or layout similar to that of Figure 19, but in the present case the speeds are controlled by control of blade pitches, and the powers are controlled by control of throttles.

Figure 1ª shows a fragmentary portion of one of the layouts, being the bus bar portion thereof, on enlarged scale to better show the connections thereof and thereto; and Figure 1ᵇ shows a fragmentary cross-section through the electro-magnetically operated brake for locking a synchronous control device during certain conditions of operation wherein such locking is or may be desired.

Referring first to Figures 10 and 11, I shall describe a typical synchronizing unit embodying certain of the features of my present invention, and which has been devised to meet the conditions existing in the solution of the entire problem herein set forth. In this case I have provided a rotating field polyphase element (corresponding to the usual stator of a synchronous motor) 50 in conjunction with a field element 51 rotatable relatively thereto. Both of these elements are rotatable in themselves, that is, with respect to the frame element 52, as well as relatively. To this end the field element 51 is carried by a shaft 53, journalled at one point to the frame, as by the ball bearing 54. This field element is excited in the usual manner by the field coils 55, carried by the pole pieces 56, so that north and south poles are generated in the usual manner. Suitable slip rings 57 are provided for supply of exciting current to these coils from a point external to the field element.

The polyphase element 50 includes the laminated core of ring type 58 set into the shell 59, which shell is carried by the shaft section 60 which reaches in the opposite direction from the shaft 53. This shaft section 60 is suitably journalled to the frame 52, as by the ball bearing 61; and suitable slip rings 62 are provided for supply of three phase current to the windings of this element 50. Conveniently the two shafts 53 and 60 are telescoped in the central portion of the structure, as shown, so as to provide a very sturdy and well aligned structure, keeping in mind the fact that the clearance between the two elements 50 and 51 should be small due to the fact that we are dealing with alternating current conditions. Furthermore, I have shown the ball bearings 63 and 64 between the shaft section 53 and the polyphase element 50, so as to permit very smooth and easy running of these parts relatively to each other. As a matter of structural convenience I have shown the pole pieces 56 of the field element 51 as being provided with the caps 66 which retain the coils 55 in position on the pole pieces, these coils being specially shaped to set together into a very compact form of structure as shown. I have also shown the polyphase element as provided with the slots or tunnels 68 for accommodation of the polyphase windings in well understood manner. I deem it unnecessary to describe in detail the polyphase winding of this unit, as same may be of suitable scheme to provide a rotating field in the ring element 58 in well understood manner. Probably in most cases the polyphase windings will be delta connected together.

Now it will be noted that with this unit, if the polyphase windings be supplied with current of a given frequency, so that there is produced a rotating field in the element 50, of, say, 60 cycles p./s., and if under these conditions the field element 51 be excited with direct current to produce fixed poles, then the synchronous speed of the unit will be 1800 R. P. M.; and if under these conditions the shaft 60 be rotated at such synchronous speed the polyphase element will remain stationary, notwithstanding that it is actually free to rotate in either direction as needed. In other words, under the assumed conditions of rotation of the shaft 60 at synchronous speed, the polyphase element will remain stationary. If, now, there be a departure of the speed of the shaft 60 from such synchronous condition, then the polyphase element 50 will have to rotate either forward or backward with respect to the frame 52 in order to maintain the required magnetic lock between the field and polyphase elements, due to the presence of the rotating field in the element 50. For example, if the speed of shaft rotation of the shaft 60 be lowered to 1750 R. P. M., there will exist a differential of 50 R. P. M. as between the speed of the shaft 60 and the speed of the rotating field, and since the shaft speed is less than the speed of the rotating field it will be necessary for the element 50 to rotate backwardly at 50 R. P. M. in order to maintain the condition of synchronism as between the field and polyphase elements, due to the magnetic lock between these parts. On the other hand, if the shaft speed of the shaft 60 were greater than the synchronous speed, for example, 1850 R. P. M., it would be necessary for the element 50 to rotate forwardly at the differential of speeds, namely, 50 R. P. M.

Now, according to one important feature of my present invention I make provision for positively drivingly connecting one of the elements 50 or 51 to the motor shaft, as by a gear drive, and for connecting the other of said elements to the device to be controlled, for example the motor throttle, in such manner that this differential of speeds causes the proper correction to be made in such control element in order to bring the motor speed to the condition of synchronism, as dictated by the frequency of the rotating field of the element 50, which in turn depends on the polyphase frequency supplied to such element. I also provide means to supply such polyphase current at a pre-selected frequency under control of the plane pilot, or otherwise, so that he has it in his power at any time to determine the frequency of such polyphase system, and therefore to determine the motor speed.

It should be here mentioned that either of the elements 50 or 51 may be connected to the shaft as desired, the other of said elements being connected to the device to be controlled; but generally the shaft 60 carrying the field element will be connected to the motor shaft, as a matter of convenience.

Now referring to Figure 1, I have therein shown a typical four motor layout, including the motors 69, 70, 71 and 72. These are provided with their power shafts 73, 74, 75 and 76, respectively, and said shafts carry or drive the propellers 77, 78, 79 and 80 in the well understood manner. These propellers are generally provided with variable pitch blades, and suitable means to control the pitch thereof, either singly or in gang. In the layout shown in Figure 1 I have shown the oil cylinders 81, 82, 83 and 84 for the several propellers, said cylinders being provided with the oil lines 85—86, 87—88, 89—90 and 91—92, respectively; the lines 85, 87, 89 and 91 being for supply of oil to increase pitch, and the lines 86, 88, 90 and 92 being for supply of oil to decrease pitch. Said oil lines are carried to suitable control means, either automatic, or manual so that the propeller pitches can be controlled from the control stand.

In the layout shown in Figure 1 these pitch control oil lines are brought to the valves 93, 94, 95 and 96; and in Figures 6, 7, 8 and 9 I have shown a typical form of valve suitable for effecting control of oil deliveries and releases from these lines. This valve includes the casing 97 where in is rockingly placed the plug valve 98, which plug valve has the stem 99 reaching out of the top of the device, and provided with the control handle 100. A suitable packing gland 101 may, if desired, be provided at the point of stem exit. The two lines (85—86, or 87—88, or 89—90, or 91—92, as the case may be) are brought to the ports 102 and 103 of the casing; and at other suitable points the casing is provided with other ports 104 and 105 which are for supply and return of oil to the valve. For example, the port 104 may be a return port, and the port 105 a presure supply port. The plug 98 has a passage 106 extending across it at the plane of the ports 102 and 103, and one end of said passage is carried down to the plane of the ports 104 and 105, as shown at 107. Another passage 108 at right angles to the passage 106 is located at the plane of the ports 104 and 105, out of communication from the passage 106; and the ends of said passage 108 are carried up to the plane of the ports 102 and 103, as shown at 109 and 110. The several ports and passages are so formed that laps between them are avoided so as to prevent cross flows of oil.

With this valve arrangement it will be seen that with the plug standing in the position of Figure 6 all ports are sealed, and the blade shifting device to which the oil lines are connected will be oil locked against shift in either direction, and oil can neither be supplied to nor released from such blade shifting device. By turning the handle 100 in one direction from such central position pressure oil will be delivered to one of the oil lines, and release oil will be released from the other oil line, the pressure oil coming from the port 105 and the released oil being returned to the port 104; so that the blade shifting device will be properly functioned under control of such valve; and such functioning will continue as long as the valve remains in such shifted position, or until the blades have been completely shifted, either to the full feathering or the zero pitch position. On the other hand, by turning the valve to a functioning position, and quickly thereafter returning it to its central position, the blades will be shifted only partially in the desired direction of adjustment.

In the layout shown in Figure 1 I have also provided a suitable source of pressure oil and return of released oil under the control of the valves 93, 94, 95 and 96. In this case I have provided the oil pump 111, drawing oil from the release or sump chamber 112, and delivering it to the pressure chamber 113; and I have provided the return oil line 114 leading from the ports 104 of the valves to the chamber 112, and a pressure oil line 115 leading from the pressure chamber 113 to the ports 105 of the valves. I have also shown the gang control rod or element 116 which may be releasably connected to the several valve handles 100, so that by connecting all said handles to said gang control all the valves will be gang controlled, and so that by disconnecting any one or more of said handles from said gang control such particular valve or valves may be individually controlled for individual control of pitch of such particular propeller.

Any suitable means may be provided for connecting each of the handles 100 to the gang control rod 116, such as set screws or the like, the details whereof need not be illustrated herein.

In the layout of Figure 1 each of the motors is shown as being provided with a main fuel supply pipe or manifold 117, having the throttle 118, and the mixture delivered to such manifold pipe comes from the carburetting device 119. Rocking of the throttle 118 serves to control fuel supply in the well understood manner. In case very accurate speed control were to be effected by use of such main throttle alone, especially in the case of large powered units, as for example, upwards of one to two thousand horse-power, it might be found difficult to secure very close or accurate synchronous control. This is because very slight changes of such throttle position would necessarily result in considerable changes of delivered power. I have therefore, as an alternative scheme, shown in Figure 1 each motor as being provided with a supplemental or trimming fuel manifold 120, connected in "parallel" with the main manifold, and at a position beyond the main throttle 118, so that fuel supplied through this trimming manifold will reach the motor supplemental to that of the main manifold; and I have shown such trimming manifold as provided with the relatively small throttle 121, such trimming manifold being supplied with fuel by the relatively small carburetting device 122. Both the carburetting devices 119 and 122 are supplied with raw fuel through the fuel supply line 123, leading to the particular motor from the main fuel supply line 124. Said main fuel supply line 124 is supplied with fuel under pressure by the pump 125, drawing from the supply tank 126, in convenient manner. It will be noted that with this fuel supply scheme all the motors receive the same grade of fuel at any given time, so that they all receive fuel of the same B. t. u. content, and therefore of the same power generating ability. Also they all receive at any given time fuel of the same octane rating, etc.

In the layout of Figure 1 I have made provision for synchronizing speeds of the several motors by throttle controls thereof; and in this scheme each such motor is speed controlled for synchronizing by means of control of the trimming throttle thereof. In this layout I have provided a "pilot" polyphase circuit 127, including the three lines supplied with three phase current from a small motor-generator including the direct current motor 128 driving the small three-phase alternator 129 by shaft connection between these elements. This direct current motor receives supply current from the battery or other convenient source 130 over the lines 131 and 132; and speed control means are provided for controlling the speed of such motor under control of the pilot of the plane. This may be effected, for example, by control of the field 132$^a$ of such motor by a rheostat 133 in well understood manner, the motor preferably being of the shunt type.

The polyphase lines 127 receiving current from the alternator 29 will be excited at a frequency depending on the speed of the motor 128, so that by control of such speed the pilot has it in his power at all times to control or change the frequency of the motor speed control system. The details of this scheme will be disclosed presently. Now it is evident that increase of motor-generator or "pilot" speed will increase not only frequency, but also voltage delivered by such unit; and conversely, reduction of motor-generator speed will reduce not only frequency but also voltage delivered to the polyphase control circuit or line 127. Since this polyphase circuit delivers current to the several control elements for the several power motors, it is manifest that in case of very low speeds or frequencies the voltage of the control system might fall below the effective voltage at which the several synchronous control elements will remain in step; so that in such case effective speed controls of the power motors would be lost. I have made provision to guard against this condition, as follows:

The field of the polyphase generator is shown at 134 in Figure 1; and this field is supplied with direct current from the supply lines 131 and 132 through suitable slip rings as shown in Figure 1. There is provided a field control rheostat 135 for this alternator, so that by control of this rheostat harmoniously with control of speed of the motor-generator, the alternator field may be stiffened up as speed is reduced, so that voltage generated will either be maintained or even increased as frequency falls, within a wide range of frequencies of control. Generally both the rheostats 133 and 135 will be gang controlled by a single handle or button, so that the plane's pilot has merely to control the one element in order to control frequency, and at the same time have compensation of voltage of the speed control circuit. In connection with this voltage control of the alternator, it is to be noted that such alternator should preferably be designed to operate its field with an excitation normally well below the knee of the exciting curve thereof, so that suitable response of excitation thereof may be secured over a wide range with reasonable changes of exciting current.

The polyphase speed control current from this pilot alternator is delivered to the several polyphase elements 50 of the several control devices, through suitable switching elements which will be explained presently.

Each of the speed control elements for a power motor is conveniently mounted on a bracket or platform of small size, 136 on the trimming manifold of such power motor. The throttle 121 of such motor is firmly fixed to the shaft 137 so that the positions of such throttle and its shaft are always harmonious. Mounted on such shaft 137 with a friction drive capable of slipping is the worm gear 138; and the shaft 53 of the control element is provided with a worm 139 meshing with such worm gear to drive the same. The friction drive from the worm gear 138 to the shaft 137 is of sufficient friction drive effect to ensure proper movements of the shaft 137 (and throttle 121) with movement of the gear 138 until said shaft reaches either limit of its movement as limited by either of the stops 147 or 148 presently to be described. The shaft 60 of such control element is provided with a gear 140 which is geared to the power motor shaft, 73, 74, 75 or 76, as the case may be, so that speed of the shaft 60 of such control element is always exactly proportional to power motor speed. The polyphase current of the pilot circuit is delivered to the polyphase element 50 of the control device, so that there is created in such polyphase element a rotating field whose speed is determined by the pilot control, as will be evident from the explanation so far given.

Now if the speed of the power motor is exactly that predetermined by the pilot, the polyphase element 50 will remain stationary or non-rotating, and there will be no rotative force communicated to the trimming throttle, so that fuel supply to the power motor will continue unchanged. Now if for some reason the speed of the power motor departs from synchronism, for example, rises above synchronism, the element 50 will commence to rotate in one direction or the other at a rate depending on the amount of such departure from synchronism; and such rotation will immediately commence a corrective turning of the trimming throttle in the proper direction to restore the condition of synchronism. It is to be noted that such corrective action will continue until complete synchronism has been attained; and if another departure from synchronism should occur, either in the same or contrary direction, corrective action will at once commence, and will continue until synchronism has again been attained. In fact, normally there will probably occur a more or less continuous corrective action, back and forth, in one direction or the other, but always in proper direction, and of proper amount to restore synchronous condition. It is also to be noted that immediately any departure from synchronous condition occurs, a corrective action will commence, and the rotation of the trimming throttle shaft will continue until complete correction has occurred.

Now ordinarily the amount of corrective action needed to maintain the condition of synchronism will be relatively small, such as a few percent of the power being generated by the power motor, or a few percent of the momentary synchronous speed. Such corrections will be handled conveniently by a trimming throttle of relatively small size. In case of large swings of departure from synchronism, however, it will be evident that the trimming throttle may be moved clear over in the one direction or the other without restoring the synchronous condition; and under these conditions it is necessary to provide means to automatically effect further corrective action by manipulation of the main throttle 118. Such means I have provided herein. To this end I provide the main throttle on a shaft 141 to which such main throttle is firmly connected; and this shaft carries by friction drive a worm gear 142. There is provided a small direct current motor 143, carried by a bracket or the like 144 on the main manifold 117, such motor 143 being drivingly connected to the worm gear 142 as by the worm 145. This motor 143 receives direct current from the lines 131 and 132, through suitable control switching devices; and included in these switching devices are the following: The trimming throttle shaft 137 carries at its back end a swinging arm 146 which is adapted to strike a stop pin 147 or 148 at one side of its swing or the other, as the case may be, to arrest the swinging of the trimming throttle at its full position in one direction or the other, and thereby prevent over-riding of such throttle. The trimming shaft also carries another arm 149 which has the contact plate 150, connected to one side of the direct current supply system from the lines 131 and 132; and there the provided the two stationary contacts 151 and 152 in position for engagement by said contact 150 at one or the other limit of swing of the trimming throttle, as the case may be. The motor 143 is a reversible direct current motor of convenient design, and the contacts 151 and 152 are so connected to said motor that the direction of motor rotation will be determined by which of said contacts is momentarily engaged by the swinging contact 150. To this end one side of the motor circuit is connected to one of the direct current lines by the lead 153 (see Figure 1), and the contacts 151 and 152 are connected to the proper terminals of the motor by the leads 154 and 155 (see Figure 1).

With this arrangement the following operations will occur:

In case of complete riding of the trimming throttle in either direction, its further rocking will be arrested by engagement of the arm 146 with one or the other of the stops 147 or 148; and at the same time the contact 150 will engage one or the other of the contacts 151 or 152, as the case may be. Since the condition of synchronism has not yet been attained the polyphase element 50 of the synchronizing device will continue to rotate, but the worm gear 138 will slip on the shaft 137 during this portion of the operation. As soon as one or other of the contacts 151 or 152 has been engaged, current will be delivered to the motor 143 of the main throttle, and rotation thereof will commence, rocking such main throttle in the proper corrective direction. Such corrective rocking of the main throttle will continue until complete synchronism has been attained, and due to the fact that the operation of the main throttle is fast, in a corrective sense, there will probably occur a slight over riding of the corrective influence, so that the condition of synchronism will be slightly passed or exceeded. Thereupon a further corrective action in the reverse direction of the trimming throttle will occur, and as soon as such trimming throttle moves slightly back from its extreme position, the contact 150 will move away from the contact 151 or 152, as the case may be, so that further operation of the main throttle will cease, and the final trimming action will be effected by the trimming throttle, leaving the main throttle in its newly established position. Thereafter trimming will occur only by the trimming throttle, until a new requirement for large trimming in one direction or the other occurs.

Now it was mentioned that the worm gear 142 is frictionally mounted on the shaft 141 of the main throttle. This shaft 141 is connected to a suitable manual control for either single or gang control of the main throttles by the plane's pilot, as will presently appear; and during such manual control it is necessary to rock the main throttle notwithstanding that the motor 143 and worm gear 142 are not rotating at the instant. Such result may be effected by the presence of the friction drive between the shaft 141 and the worm gear 142.

Referring to Figure 1 I have therein shown the several main throttle shafts 141 as being connected to the several manual control rods 156, 157, 158 and 159, respectively; and these rods are all brought to a point convenient to the pilot of the plane, as shown at 160 in Figure 1. I have also provided a gang control element 161 to which any one or all of these control rods may be connected, as by the use of set screws or the like, so that by single manipulation of this gang control element all the main throttles may be simultaneously controlled manually; or conversely, any one or more of them may be released from such gang control, and individually manually controlled. Now it is noted that during automatic control for synchronism these control rods should be disconnected from the gang control device so that as the several main throttles are called on to rock under automatic control, such rocking may occur for each main throttle individually. In case of a condition in which all the synchronous control automatically should be accomplished by use of the trimming throttles, without use of the main throttles, it would not be necessary to disengage these control rods from the gang control in the foregoing manner, and still automatic control for speed and synchronism would be effected.

Each of the polyphase windings of the synchronous control devices is brought to a switching location convenient to the pilot. Thus the three-phase lines 162, 163, 164 and 165 for the synchronizing devices of the several power motors are brought to the switching position or stand shown in Figure 1 just above the valves 93, 94, 95 and 96. This switching stand includes two sets of three phase bus bars, 166 and 167, respectively. The output lines 127 from the pilot alternator 129 connect directly to the bus bars 166, so that these bus bars are excited at all times at frequency equal to the momentary frequency being delivered, and according to the desires of the pilot of the plane. A suitable instrument 168 is provided to indicate according to this frequency, but said instrument will generally be calibrated to read in R. P. M. direct.

There are provided separate three pole triple throw switches 169, 170, 171 and 172, corresponding to the several power motors which are to be synchronized, and the blades of these switches connect directly to the several three-phase lines 162, 163, 164 and 165, respectively, for the several power motors. One set of contacts for each of these switches connects to the bus bars 166 (see Fig. 1a), another set of said contacts connects to the bus bars 167, and the third set of said contacts is dead, corresponding to the off position of the switch. Thus, either set of three-phase lines 162, 163, 164 and 165 may be individually switched either to the off or dead position, or to either set of bus bars, under manual control of the pilot of the plane. A phasing or timing instrument 173 is connected to the bus bars 167, said instrument reading similarly to the instrument 168, for example, in R. P. M.

Under normal operating conditions all the sets of three-phase lines 162, 163, 164 and 165 are switched to the bus bars 166 so that all the power motors are controlled automatically for speed, by requirement for synchronous condition with respect to the frequency being generated as determined by the plane's pilot. However, if desired, any given power motor may be instantaneously cut off from such automatic control by merely switching its switch to the off position (or else to the bus bars 167). For example, in case of damage to any power motor same may be cut off from the automatic synchronizing system in this manner. Furthermore, when bringing in any given power motor which may have been idle, it is desirable to get it to a speed approximating the momentary speed as dictated by the setting of the pilot circuit, under control of the plane's pilot. Thereby any violent reactions during initial or starting condition may be avoided. To this end, when a power motor is to be brought to the automatic speed control condition its switch 169, 170, 171 or 172 may first be thrown to the bus bars 167, and such motor may then be manually brought to a speed approximating that indicated by the instrument 168 (that is, the speed of the incoming power motor as read on the instrument 173 may be brought close to the speed indicated by the instrument 168, and then the switch for the incoming motor may be thrown to the bus bars), whereupon automatic control of such power motor for speed will be assumed by the system.

The following operating condition is also to be noted:

If for any reason the pilot frequency three-phase circuit 127 should fail (due for example to failure of the pilot alternator, or to failure of some other portion of this system) it would be possible to disconnect any or all of the power motors from the bus bars 166 and/or 167 by proper movement of the switches 169, 170, 171 and 172, then relying entirely on manual and individual speed control of each power motor individually. Or, under these or other conditions which might arise all the switches or any selected grouping of them might be thrown to one or the other set of bus bars, so that the interconnection of the speed control devices of two or more of the power motors would be created. Then any given power motor might be selected as a "pilot" motor, its speed being manually and individually controlled by manual throttle operation by proper disconnection from the gang control 161. Then such "pilot" power motor would rotate its control device at a speed proportionate to the speed of such power motor, and, due to excitation of the field of such control device there would be generated a frequency proportionate to the speed of such power motor, such control device acting as an alternator and delivering three phase current to the bus bars at a frequency determined by the manual control of such "pilot" motor, and bringing all the other power motors into synchronism with such "pilot" motor insofar as respects speed condition. In this connection any of the power motors might be thus selected as a "pilot" motor under such conditions; and all or any selected group of the remaining power motors might be switched into speed control therewith.

It is to be noted that under the foregoing conditions the three phase wound element or stator of such control device should be locked against rotation during such "pilot" control operation, so that a proper reaction effect could be produced for generation of the three phase pilot control currents. To this end I have of the device or housing. The sleeves 186 and 189 are provided with companion ports 190ª, and 191 which, when the plunger has followed the control sleeve to a new position, close, but which, when the control sleeve is moved in either direction, serve to permit pressure oil to enter and press against the plunger at the proper face, and to permit release of oil from the other plunger face, to cause plunger movement. Such movement will restore the ports to the closed condition when the plunger has come to its new position as dictated by such control sleeve movement. Pressure oil is supplied to the device through the port 192, and released oil is delivered from the device through the ports 193 and 194.

Now in the layout of Figure 17 I carry oil lines 195 and 196, for pressure and release, respectively, from the oil system such as heretofore described in connection with Figure 1, to the several servo-motor locations; and these lines are connected respectively to the proper ports of the several servo-motors, so that the blade shifting devices thereof may be power operated by such pressure oil.

Corresponding to the several power motors, and to the servo-motors thereof, are the small control cylinders 197, having the plungers 198. These plungers are connected to the control rods 190 of the several servo-motors, so that by oil operations of these plungers 198 the control rods of the servo-motors are also operated to cause corresponding placement of the servo-motor plungers, and thus also power functioning of the blade shifting devices. There are connected to the ends of the small cylinders 197 the oil lines 199 and 200, for each of said cylinders, and these oil lines follow to the control valves 201, 202, 203 and 204 for the respective power motors. The constructions of these valves will be disclosed presently herein. These arrangements provide for manual control and adjustment of the several propeller blades by use of pressure oil and from a common stand or location.

I have also made provision for automatic control and adjustment of the blade pitches according to power requirements or adjustments. These I shall now describe:

The fuel meter 177 of the "pilot" power motor is connected to a small polyphase alternator 205, excited by direct current in the well understood manner. An indicating meter 206 is provided in connection with the polyphase lines 207 leading from this pilot alternator, showing either frequency or power or some other function, as desired. The polyphase lines 207 extend to locations close to all the other power motors. Adjacent to each of the fuel meters for each of these other power motors are the synchronous control devices, such as already described in detail, and shown in Figures 10 and 11 hereof. The direct current field of each of these control devices is connected to the shaft of the corresponding fuel meter, and therefore rotates at the speed thereof; and the polyphase element of each of these control devices is connected to the lines 207, and therefore has generated in it a rotating field proportionate to the frequency of the polyphase current being supplied thereto, and thus also proportionate to the rate of fuel consumption (power) being generated by the "pilot" power motor. The polyphase element of each of these control devices has its shaft worm gear connected to a segmental rack 208, so that such rack is rocked in one direction or the other according to the differential between the speeds of the frequency on the lines 207 and the fuel meter of the power motor in question. Connected to each segmental rack 208 is an arm 209 which will swing back and forth according to controlled rack movements. There is a lever arm 210, pivoted at 211, for each such arm 209; and a pin and slot connection 212 is provided between each of the lever arms and the corresponding arm 209. Furthermore, there is a pin and slot connection 213 between each of the lever arms and the control rod 190 of the corresponding servo-motor. Thus it is evident that movements of the control rod 190 of the servo-motor may be effected either by the plunger 198 in the small cylinder (manual control from the corresponding valve 201, 202, 203 or 204), or by automatic control effected by the differential of powers of the "pilot" motor and the motor being so controlled.

Normally each of the power motors, except the "pilot" motor, has its power controlled automatically, so that the segmental racks 208 are normally meshed with the worms of the control device shafts. Such condition is that shown in Figure 17. When, however, it is desired to effect manual control of the blade shifting, by suitable operation of the valve 201, 202, 203 or 204, as the case may be, it is necessary to disconnect the segmental rack 208 from the shaft worm of the control device, in order that such segmental rack may be swung in one direction or the other under such manual control. To this end I provide a pivotal mounting for each of the control devices of the fuel meters, so that same may be swung down to disengage its segmental rack from the shaft worm, during such manual control. Then I provide a small cylinder 214, having the plunger 215, for each control device, and the plunger rod 216 from such plunger reaches to the control device shaft, so that said rod controls the engagement and disengagements of the control device shaft with and from the segmental rack. A spring 217 serves to restore the engagement of the shaft worm with the segmental rack for normal operation. There is an oil line 218 connected to each of these small cylinders 214; and such oil line is carried to the corresponding control valve 201, 202, 203 or 204, as the case may be, so that pressure oil is admitted to such small cylinder harmoniously with a manual control operation, in order to release the segmental rack from the shaft worm, and permit such manual operation without interference from the presence of the automatic control device.

Reference to Figures 13, 14, 15 and 16 shows the construction of one of the control valves 201, 202, 203 or 204, as the case may be. This valve includes the cylindrical casing 219 wherein the plug valve 220 operates, said plug valve having the stem 221 passing out through the packed gland 222, and said stem having the control handle 223. At a high level the housing 219 is provided on one side with the ports 224 and 225, to receive the lines 199 and 200, respectively, which lead to the manual control cylinder 197 of the corresponding power motor installation. On the opposite side of the valve housing and at the same level is the pressure oil supply port 226 to which is connected the pressure oil line 195. At a lower level the housing 219 has the port 227 beneath the ports 224 and 225 and centrally between them; and at this lower level, and beneath the port 226 is the discharge port 228 which connects to the oil return line 196. The valve plug has the segmental opening 229 which registers with the pressure supply port 226, and a passage 230 extends from this segmental opening to the opposite side of the shown the shaft 60 of each such control unit as being provided with a small brake drum 60ª, with which a brake band 60ᵇ may be co-operated to lock the wound element 50 against rotation as long as the solenoid 60ᶜ is energized by direct current supplied over the leads 60ᵈ and 60ᵉ, the armature 60ᶠ of such solenoid acting, during such energization, to tighten the brake band and lock the element 50 against rotation. These leads 60ᵈ and 60ᵉ are carried to points convenient to the pilot of the plane, as for example close to the gang control device 161 for the main throttles, where suitable switches are provided whereby the pilot may cause locking of the element 50 of the desired control device, being the one of the power motors which he is to use as his "pilot" motor. Normally these leads 60ᵈ and 60ᵉ are left unenergized so that the corresponding elements 50 are free to rotate for their control functions.

From the foregoing it is seen that I have provided a very flexible arrangement for speed controls of the several power motors, and have provided insurance against any adverse conditions which might arise in operation. This is especially important in connection with such multi-motored planes as are used in military or naval or like operations.

Reference may now be had to Figure 17 wherein I have incorporated certain of my features of invention in an arrangement wherein no special "pilot" circuit is provided for generating polyphase current of a pre-determined frequency to control the speeds of the several power motors. In the present case one of the power motors, for example, 72, is used as a "pilot" motor for speed control. To this end this particular power motor is speed connected to a special small three phase alternator 174, which supplies polyphase pilot current for the speed control operations of the other power motors, in manner similar to that already explained with respect to the general scheme of Figure 1. It is deemed unnecessary to explain in full detail all the connections and devices of this portion of the disclosure of Figure 17, as same have been fully gone into with respect to the arrangement of Figure 1.

However, in the arrangement of Figure 17 I have, in addition to provision for control of speed and synchronization thereof, made provision for control and synchronization of powers of the several power motors. To this end I have provided for measure of the momentary power being delivered by each power motor, so that same may be compared with the powers being delivered by the other motors (or with a suitable pilot power circuit, as will be hereinafter described). Any suitable form of power metering device may be used in connection with each power motor; but generally speaking such power metering devices require measurement of torque and speed, and proper co-relation of these factors. As a simpler expedient and one which will effectively and accurately conform to the requirements of the present problem, I prefer to provide a fuel metering device or meter in the fuel line leading to each power motor, such, for example, as well known metering devices of the plunger or even the nutating plate types which are well known in the metering arts. By selection of a meter of proper and suitable size consistent with the fuel flow requirements of the power motor, when said motor is operating at its usual load conditions, it is possible to secure very accurate measure of power being delivered by such power motor, by making use of the rate of shaft rotation of the fuel meter. In the case of the relatively large sizes of power motors being currently used on airplanes and the like (upwards of one to two thousand horse-power), and when said power motors are operating at powers of over, say, one-fourth their rated output, it will be found that the rate of meter shaft rotation will very closely follow or be a direct function of the delivered power. While it is true that the actual horse-power output of such power motor will depend on various conditions, such as octane rating of the fuel being used, atmospheric or super-charger pressure, etc., still it is nevertheless true that the rate of meter shaft rotation will be directly proportional to the rate of power delivery, and therefore such rate of shaft rotation will be a proportionate measure of power being delivered by such power motor.

Furthermore, in the case of a multi-motored airplane, in which all the motors are receiving fuel from the same source of supply, or from the same fuel line, it is evident that as between these various motors the rates of rotation of the shafts of their several fuel metering devices will be a very accurate means of determining the relative power outputs of the several power motors at any given instant; and therefore such metering devices constitute a very simple and accurate means for measuring or comparing power outputs of the several power motors for purposes of power synchronization and for other purposes, as will hereinafter appear.

In the layout of Figure 17 I provide a fuel supply line 175 receiving fuel under pressure from the fuel pump 176; and for each of the several power motors I provide a fuel meter 177, same being placed in the fuel supply line leading from the main fuel supply line 175ª to the carbureting device or devices for such power motor. The shafts 178 of these fuel meters therefore rotate at speeds proportionate to the powers being delivered by the several power motors.

The propeller of each of these power motors is provided with servomotor means to regulate or control the pitches of its blades. These servomotor devices are shown at 179 for the several propellers. Each of these servomotor devices is of such construction that when its control valve is moved to a given position or adjustment, its plunger will be moved by oil pressure to an exactly corresponding position, and will be oil locked at such position until a new setting of its control valve is made. A typical servomotor responding to such requirements is shown in Figure 12, and is also shown in Letters Patent of the United States, No. 1,642,193, issued September 13, 1927, on my application. This servomotor includes the casing or housing 180, including the end caps 181 and 182. The power motor shaft 183 extends through this servomotor from the power motor to the propeller hub. Within this housing and surrounding the power shaft 183 is the annular plunger 184; and the sleeve 185 surrounding the power shaft 183 is connected to this plunger and passes out through the end cap 182. Said sleeve connects to the blade shifting device in the propeller hub, so that back and forth movements of said sleeve serve to control propeller blade pitch.

Said plunger is also provided with an outside or valve sleeve 186 which reaches over and laps onto the inwardly reaching portions of the end caps 187 and 188 as shown. Surrounding this sleeve 186 is the valve or control sleeve 189; and this valve sleeve 189 is shifted back and forth by the control rod 190 which reaches to the outside plug, and at the higher level thereof. On the sides of the plug at this higher level are the arcuate cut away portions 231 and 232 which register with the ports 224 and 225, respectively for all positions of the plug.

At the lower level the plug is provided with an arcuate cut away portion 233 which registers with the discharge port 228 for all positions of the plug; and at this lower level there are the housing ports 234 and 235 which connect by the passage in the housing 236 with the port 227 from both sides thereof. The segmental cut away portion 233 connects with a space 237 beneath the plug; and extending down on the sides of the plug, normally in register with the ports 234 and 235 (when the plug is in its central or normal position) are the slots 238 and 239. Likewise the slots 240 and 241 extend down along the sides of the plug from the segmental cut away portions 231 and 232 to the space beneath the plug.

With this form of plug valve the following conditions will exist:

When the valve stands in the position shown (central), pressure oil is cut off from all lines 199, 200 and 218. Also, at such time all these lines are relieved and are connected to the oil return line 196; and also both of the lines 199 and 200 are connected together at the position of such valve. Upon turning the plug in one direction or the other, either the line 199 or the line 200 will be connected to the oil pressure line 195, and the line 218 will also at such time be connected to such oil pressure line; and the other of such lines 199 and 200 will be connected to the oil return line.

It is also noted that with this valve arrangement, when the valve plug stands in its central position both of the lines 199 and 200 are connected together, so that during automatic control by means of the control device (synchronous), the plunger 198 is permitted free movement in either direction under action of the control device, and without oil lock, for automatic operations. Suitable gang control devices are provided in connection with the valves 201, 202, 203 and 204, so that if desired all these valves may be operated in gang, or any group may be so operated, or they may all be operated singly.

With the arrangement of Figure 17 the "pilot" power motor is normally controlled manually by independent control of its main throttle, for speed control, and by independent control of the pitch of its propeller blades for power control. Then, due to the action of the control circuit alternators 174 and 205, the speed and power of each of the other power motors will be brought into synchronism with the speed and power of the "pilot" motor; the speed of each of the other power motors being controlled by throttle control, and the power of each of said other power motors being controlled by control of the pitch of the blades of its propeller.

In the layout of Figure 18 I have departed from that of Figure 17 in the sense that in Figure 18 I have provided a special motor-generator alternator unit 240ª, whose frequency is under control of the pilot of the plane; and this unit delivers current to the pilot three phase lines 241ª for control of one function of all the power motors. But in the present case, also, the fuel meters are connected to the motor throttles, and with the control units operating in conjunction therewith, for synchronization of powers of the power motors by throttle control. Furthermore, in the present case one power motor serves as a pilot motor for speed control of the other power motors by control of pitches of the propeller blades. To this end said "pilot" motor drives the small three phase alternator 242 at speed proportionate to power motor speed, said alternator serving the three phase pilot line 243. Then the pitches of the propeller blades of the other power motors are controlled by the control units operating off this three phase line, to maintain the speeds of the other power motors at synchronism by blade pitch control. Means are also provided in the arrangement of Figure 18 for manual control of the pitches of the blades of said "pilot" power motor.

In the layout of Figure 19 I have provided two pilot three phase alternators, direct current motor driven, for providing pilot three phase circuits for both speed and power of the power motors. These are the units 244 and 245, respectively. They serve the pilot three phase lines 246 and 247, respectively; and these pilot lines serve the several power motors for control of speed by throttle control, and control of power by blade pitch control, respectively. The details of all these functions will be well understood from the disclosures hereinbefore given.

In the layout of Figure 20 I have also provided the two pilot motor generator units 248 and 249, respectively, for control of power and speed, respectively; and in this layout control of power is effected by throttle controls, and control of speed is effected by control of pitches of the propeller blades. The details of this layout, likewise do not require detailed description, in the light of the previous disclosures made herein.

Generally in the operation of the airplane it will be desirable to set the power motor speeds, and then hold them at such setting automatically by the speed controls; and the power settings may be changed from time to time by manipulation of the pilot power motor generator set. Such operation may be admirably secured by such a layout as that of Figure 19, for example. In the service operation of such a layout as that of Figure 19, assuming that the speeds have been adjusted and synchronized to correspond with the pilot speed circuit, the throttles will have been brought to such conditions that the several power motors are delivering the demanded powers, as dictated by the setting of the power control circuit, each propeller having its blades brought to pitch condition to absorb the prescribed power at the speed dictated by the speed control circuit. Now if the power factor be changed, for example increased, by a new setting of the control circuit for power, by increasing blade pitches, a reduction of speed will momentarily occur, and this will at once cause the several motor throttles to move further open, and thereby restore the several motor speeds to the prescribed speed. Thus, although the power controls operate on the blade pitch control mechanisms directly, still the ultimate result of power control is to also reflect into the throttle settings, since the power in fact comes from the consumption of fuel delivered through said throttles.

Considering again the matter of measurement of power by measurement of rate of fuel consumption, it will be noted that in each of the layouts herein disclosed all the power motors are supplied with fuel from a common line, so they all consume fuel of the same octane rating and other characteristics at any given time. Due to this fact, among others, it follows that if all the power motors be consuming fuel at the same rate, all said motors being of the same design and size, etc.; all said motors will be delivering power at the same rate, that is, operating at the same power, within a very slight possible error. Now, it is to be noted that insofar as concerns speed control, this factor (speed) will be accurately controlled irrespective of slight differences of power delivery as between the several power motors, since the speed of each power motor is controlled with direct reference to a specified speed or frequency of the control circuit. Therefore, speed will always be very accurately maintained with respect to synchronism, irrespective of any slight departures from exact synchronization of powers. This is an important feature of the present invention.

It is also to be noted that when speed is held uniform as between all the motors of the series, if power also be held uniform as between all said motors there will be assurance that all the propellers are demanding the same torques, their several pitches being brought to such regulations that this result is secured. This means that with control of both speed and power for uniformity as between all the power motors, there is assurance that the pulls of all the propellers are the same, so that any tendency of the plane to yaw is avoided. Simplicity of plane control is therefore provided by control of both speed and power, and danger of sudden loss of control in an emergency is greatly reduced.

It is noted that change of angle of attack of the elevators of the airplane for purposes of climb or descent in elevation are accompanied by changes of pull necessary to be exerted by the blades of the propellers; and therefore increase of rate of rise of the plane (according to change of elevators), or decrease of rate of rise (or in other words descent) of the plane, should be accompanied by suitable changes in the propeller blade pitches. I have in the present case made provision for such results, and have also tied up these changes in function with changes in motor power of corresponding nature. I am able to do this automatically in the present case as I have made provision for power controls, as hereinbefore explained.

Reference to Figure 18 shows the elevators of the plane in diagrammatic form at 250 and 251; and in that figure the control stick is shown at 252 for controlling said elevators in usual manner. I have in that figure also shown the connection 253 from the control stick 252 to the plunger of the oil cylinder which controls the setting of the propeller blades of the motor 72. With this connection it is evident that as the elevators are shifted to cause the plane to rise or descend the pitches of the propeller blades will be correspondingly changed so that change of rate of rise or descent of the plane will be accompanied by corresponding changes in blade pitches. Since I have made provision for control of pitches of the the blades of the other propellers from motor 72 to the other motor propellers, it follows that all the propellers will have their blades properly shifted from time to time harmoniously with shifts of the elevators. I have provided a disconnectable connection 254 in the connection 253 so that if desired this interconnection may be made ineffective by the pilot of the plane.

It is to be noted that in each of Figures 1, 17, 18, 19 and 20 use is made of one of the control units shown in Figures 10 and 11, and with at least one such unit for each power motor, and with certain of said units in connection with speed control; and that one of the elements of such speed control unit is drivingly connected, either to the power motor shaft, or to the shaft of the metering unit, the other element being actuatingly connected with either the throttle or the control valve device for the servo-motor which serves the propeller blade shifting device. Also, that in all cases the polyphase wound element receives polyphase current of controlled frequency, and the other element is excited with direct current to produce definite poles whose position is fixed with respect to such element. It is also noted that in every case, when there is a departure from synchronism as between the controlled speed and the speed of the rotating element (either power motor shaft or meter shaft) there is at once set up a rotation of the element not connected to such shaft, at a rate proportional to such lack of synchronism or departure from synchronism, and that such rotation at such rate is used for corrective effect directly, and without the interposition of relays or valves (except in the case of such servomotor scheme for the blade shifting device); and that furthermore, in all cases the operation is such that as correction occurs due to such rotation caused by non-synchronism, the rate of such correction decreases progressively, from a maximum at the commencement of the corrective action, to zero when complete correction has been attained. This is to be distinguished from previous schemes and arrangements in which relays have been used, or like devices, and in which the rate of correction remains constant from its beginning until the complete correction has been attained (synchronism) whereupon there will be an over-riding effect, requiring correction back and forth until finally something approximating synchronism has been secured. This result is possible in my present arrangements, due to my use of control units each having two reactive elements one of which is capable of generating a rotating field of angular velocity proportionate to a supplied current frequency, and the other of which reactive elements has definite magnetic poles of angular position fixed with respect to its physical body, and means to journal both said reactive elements for free rotation with respect to each other and with respect to the stationary object to which or with respect to which such control unit is located, or an equivalent structure.

It will be understood that I contemplate the use and application of the features of my present invention either with vapor fuel motors, such as gasoline engines, or liquid fuel motors, such as diesel type engines, or many other types of engines or motors, such as steam, etc. Where in this specification, and the claims to follow I use such terms as "throttle" I contemplate any suitable form of control throttle or valve for any such motor, as will be readily apparent from the nature of my present invention.

By the terms "fuel control throttle," or "throttle means," or "fuel supply throttle," or like terms as used in the claims I contemplate any fuel supply control or delivery means, for controlling the supply or delivery of the liquid fuel to a power motor of the internal combustion type, whether said motor being of the four-cycle type, or the diesel or two-cycle type in which the liquid fuel is forced into the cylinders under pressure; and whether such fuel supply control or delivery means be the throttle or the liquid fuel metering means for supply of liquid fuel to the cylinders under pressure and in metered quantities at each stroke.

It is noted that power is a function of the product of speed times torque, or of velocity times reaction; so by synchronizing both power and speed we have made it possible to also synchronize torque or to synchronize reaction against the body of air wherein the airplane is travelling. Such result is of great value for the purpose of facilitating the control of large airplanes, and those having numerous power units and propellers. By such synchronization of torques or reactions it becomes possible for the pilot or engineer to equalize the pulls (or pushes) of the numerous propellers of a multi-motored or multi-propellered airplane, and thus to improve the control thereof under varying conditions. This feature, combined with the ability to take over manual control of any unit when the occasion or desirability arises, becomes of great value in the case of planes of large power, and many power units.

I claim:

1. In an airplane having a plurality of power motors each of which is provided with a fuel control throttle, and a variable pitch propeller, means to control and synchronize said power motors for speed, comprising means under control of the pilot of the plane to generate a controllable frequency polyphase pilot circuit current, a polyphase reactive electro-magnetic control device for each power motor including two reactive elements, one being a polyphase wound element and the other being a fixed pole field element, means to journal both of said reactive elements for 360 degree rotation about a common axis, means to connect said polyphase wound element with said polyphase pilot circuit current, and means to drivingly connect one reactive element of each control device with the power motor shaft of a power motor, and slip drive means to connect the other reactive element of such control device with the fuel control throttle for such power motor to shift said throttle according to differential of frequencies of the polyphase pilot circuit current and the speed of the power motor shaft, substantially as described.

2. In an airplane having a plurality of power motors each of which is provided with a fuel control throttle, means to control and synchronize said power motors for power, comprising an electro-magnetic differential device for each power motor, and including two reactive elements, one of which is a polyphase element, means to meter fuel as delivered to each power motor individually, means to drivingly connect said elements, one to the power motor metering means of each power motor, and the other to the fuel throttle of such motor, means to generate a polyphase pilot circuit current, means under control of the pilot of the plane to control the frequency of said pilot circuit current, and means to supply said controlled frequency polyphase current to said polyphase elements substantially as described.

3. A system as specified in claim 2, wherein there are provided means to manually control the throttle of each power motor, and means to make ineffective the differential device for each power motor, selectively, substantially as described.

4. In an airplane having a plurality of power motors each of which is provided with a fuel control throttle, means to control and synchronize said power motors for power, comprising fuel metering means for each power motor, each such fuel metering means having a shaft rotatable in proportion to fuel consumption, a polyphase electro-magnetic control device for each power motor, each control device including a polyphase wound element and a fixed pole field element, means to drivingly connect said elements, one to the shaft of the metering means of such power motor, and the other to the throttle of such power motor, means to generate a polyphase pilot circuit current, means under control of the pilot of the plane to control the frequency of said pilot circuit current, and means to supply said controlled frequency polyphase current to said polyphase element substantially as described.

5. In an airplane having a plurality of power motors each of which is provided with a fuel control throttle, means to control and synchronize said power motors for power, comprising fuel metering means for each power motor, each such fuel metering means having a shaft rotatable in proportion to fuel consumption, a manually controllable pilot frequency generating device, and differential means in connection with the shaft of the fuel metering means of each power motor and said pilot frequency generating means and the fuel control throttle of such power motor effective to maintain synchronism between the pilot frequency generating means and the shaft rotations of the fuel metering means by variation of said fuel control throttle, substantially as described.

6. In an airplane having a plurality of power motors each of which is provided with a fuel control throttle, means to control and synchronize said power motors for power, comprising fuel supply metering means for each power motor having an element movable at a rate proportionate to the rate of fuel feed to such power motor, and synchronizing means including the power motor throttles and said movable elements of the fuel supply metering means effective to vary the throttles of the power motors according to the rates of movement of said movable elements, effectively to maintain synchronism of said rates of movement, substantially as described.

7. In an airplane having a plurality of power motors each of which is provided with throttle means to control supply of motive fluid thereto, means to control and synchronize said power motors for speed comprising an electrical differential control unit for each power motor having two reactive elements one of which is capable of generating a rotating field of angular velocity proportionate to a supplied current frequency, and the other of which reactive elements has definite magnetic poles of angular position fixed with respect to its physical body, means to journal both said reactive elements for free rotation with respect to each other and with respect to the power motor controlled by such control unit, a positive driving connection between one reactive element and the power shaft of the corresponding power motor to ensure rotation of said reactive element at speed proportionate to power motor shaft speed, a positive actuating connection between the other reactive element and the throttle means of such power motor, and manual means to control the throttles of the power motors independently of each other, together with means to lock the rotating field element of a selected control unit against rotation to thereby cause said control unit to act as a polyphase pilot generator for supply of control polyphase current for the rotating field elements of the other control units, and suitable interconnections between the rotating field elements of all said control units, substantially as described.

8. In an airplane having a plurality of power motors each of which is provided with throttle means to control supply of motive fluid thereto, means to control and synchronize said power motors for power comprising metering means for each power motor to meter fuel supplied thereto, and having a shaft rotatable at rate proportionate to the rate of fuel delivery to such power motor, an electrical differential control unit for each power motor having two reactive elements one of which is capable of generating a rotating field of angular velocity proportionate to a supplied current frequency, and the other of which reactive elements has definite magnetic poles of angular position fixed with respect to its physical body, means to journal both said reactive elements for free rotation with respect to each other and with respect to the power motor controlled by such control unit, a positive driving connection between one reactive element and the meter shaft of the corresponding metering means to ensure rotation of said reactive element at speed proportionate to meter shaft speed, a positive actuating connection between the other reactive element and the throttle means of such power motor, and manually controllable means to supply controlled frequency current to the rotating field reactive elements of all of the control units simultaneously, substantially as described.

9. In an airplane having a plurality of power motors each of which is provided with throttle means to control supply of motive fluid thereto, means to control and synchronize said power motors for power comprising metering means for each power motor to meter fuel supplied thereto, and having a shaft rotatable at rate proportionate to the rate of fuel delivery to such power motor, an electrical differential control unit for each power motor having two reactive elements one of which is capable of generating a rotating field of angular velocity proportionate to a supplied current frequency, and the other of which reactive elements has definite magnetic poles of angular position fixed with respect to its physical body, means to journal both said reactive elements for free rotation with respect to each other and with respect to the power motor controlled by such control unit, a positive driving connection between one reactive element and the meter shaft of the corresponding metering means to ensure rotation of said reactive element at speed proportionate to meter shaft speed, a positive actuating connection between the other reactive element and the throttle means of such power motor, and electrical interconnections between the rotating field reactive elements of all of the control units of power motors to be controlled, substantially as described.

10. In an airplane having a plurality of power motors each of which is provided with throttle means to control supply of motive fluid thereto, means to control and synchronize said power motors for power comprising metering means for each power motor to meter fuel supplied thereto, and having a shaft rotatable at rate proportionate to the rate of fuel delivery to such power motor, an electrical differential control unit for each power motor having two reactive elements one of which is capable of generating a rotating field of angular velocity proportionate to a supplied current frequency, and the other of which reactive elements has definite magnetic poles of angular position fixed with respect to its physical body, means to journal both said reactive elements for free rotation with respect to each other and with respect to the power motor controlled by such control unit, a positive driving connection between one reactive element and the meter shaft of the corresponding metering means to ensure rotation of said reactive element at speed proportionate to meter shaft speed, a positive actuating connection between the other reactive element and the throttle means of such power motor, and connections and switching means under control of the operator effective to determine interconnections between the rotating field elements of selected control units, substantially as described.

11. In an airplane having a plurality of power motors each of which is provided with throttle means to control supply of motive fluid thereto, means to control and synchronize said power motors for power comprising metering means for each power motor to meter fuel supplied thereto, and having a shaft rotatable at rate proportionate to the rate of fuel delivery to such power motor, an electrical differential control unit for each power motor having two reactive elements one of which is capable of generating a rotating field of angular velocity proportionate to a supplied current frequency, and the other of which reactive elements has definite magnetic poles of angular position fixed with respect to its physical body, means to journal both said reactive elements for free rotation with respect to each other and with respect to the power motor controlled by such control unit, a positive driving connection between one reactive element and the meter shaft of the corresponding metering means to ensure rotation of said reactive element at speed proportionate to meter shaft speed, a positive actuating connection between the other reactive element and the throttle means of such power motor, and manual means to control the throttles of the power motors independently of each other, together with means to lock the rotating field element of a selected control unit against rotation to thereby cause said control unit to act as a polyphase pilot generator for supply of control polyphase current for the rotating field elements of the other control units, and suitable interconnections between the rotating field elements of all said control units, substantially as described.

12. In an airplane having a plurality of power motors each of which is provided with throttle means to control supply of motive fluid thereto, means to control and synchronize said power motors for power comprising metering means for each power motor to meter fuel supplied thereto, and having a shaft rotatable at rate proportionate to the rate of fuel delivery to such power motor, a differential control unit for each power motor having two elements both mounted for free rotation with respect to each other and with respect to the power motor controlled by such control unit, a positive driving connection between one of said elements and the shaft of the metering means to ensure rotation of said element at speed proportionate to meter shaft rotation, a positive actuating connection between the other element and the throttle means effective to ensure throttle movement at all times directly proportionate to rotary movement of said element in its journals, together with means to establish a rotary reaction between said elements at a controlled speed, whereby the throttle movement is directly proportionate at all times to the differential between the speed of the element driven by the metering means shaft and the controlled speed, and whereby as synchronism between the controlled speed and the proportionate meter shaft speed is approached the rate of throttle control movement diminishes progressively until exact synchronism is attained between said controlled speed and the proportionate meter shaft speed, substantially as described.

13. In an airplane having a plurality of power motors and variable pitch blade propellers in driving connection with said motors, together with throttle means to control supply of motive fluid to said power motors, and servo-motor means to vary the pitch of the blades of each such propeller including hydraulic blade shifting means and valve means in conjunction therewith effectively to cause shifting of the blade pitches to positions definitely corresponding to positions of said valve means and to cause locking of the blades in such positions harminously with said valve movements; means to control and synchronize said power motors for speed comprising an electrical differential unit for each power motor having two reactive elements one of which is capable of generating a rotating field of angular velocity proportionate to a supplied current frequency, and the other of which reactive elements has definite magnetic poles of angular position fixed with respect to its physical body, means to journal both said reactive elements for free 360 degree rotation with respect to each other and with respect to the power motor controlled by such control unit; a positive driving connection between one reactive element and the power shaft of the corresponding power motor to ensure rotation of said reactive element at speed proportionate to motor shaft speed, a positive actuating connection between the other reactive element and the valve means of said servo-motor blade pitch varying means effective to ensure response of said valve means and said blade pitch varying means to positions corresponding harmoniously with movements of the said last named reactive element, and electrical interconnections between the rotating field reactive elements of all of the control units of power motors to be controlled, substantially as described.

14. In an airplane having a plurality of power motors and variable pitch blade propellers in driving connection with said motors, together with throttle means to control supply of motive fluid to said power motors, and servo-motor means to vary the pitch of the blades of each such propeller including hydraulic blade shifting means and valve means in conjunction therewith effectively to cause shifting of the blade pitches to positions definitely corresponding to positions of said valve means and to cause locking of the blades in such positions harmoniously with said valve movements; means to control and synchronize said power motors for power comprising metering means for each power motor to meter fuel supplied thereto, and having a shaft rotatable at rate proportionate to the rate of fuel delivery to such power motor, an electrical differential control unit for each power motor having two reactive elements one of which is capable of generating a rotating field of angular velocity proportionate to a supplied current frequency, and the other of which reactive elements has definite magnetic poles of angular position fixed with respect to its physical body, means to journal both said reactive elements for free rotation with respect to each other and with respect to the power motor controlled by such control unit, a positive driving connection between one reactive element and the meter shaft of the corresponding metering means to ensure rotation of said reactive element at speed proportionate to meter shaft speed, a positive actuating connection between the other reactive element and the valve means of said servo-motor, and manually controllable means to supply controlled frequency current to the rotating field reactive elements of all of the control units simultaneously, substantially as described.

15. In an airplane having a plurality of power motors and variable pitch blade propellers in driving connection with said motors, together with throttle means to control supply of motive fluid to said power motors, and servo-motor means to vary the pitch of the blades of each such propeller including hydraulic blade shifting means and valve means in conjunction therewith effectively to cause shifting of the blade pitches to positions definitely corresponding to positions of said valve means and to cause locking of the blades in such positions harmoniously with said valve movements; means to control and synchronize said power motors for power comprising metering means for each power motor to meter fuel supplied thereto, and having a shaft rotatable at rate proportionate to the rate of fuel delivery to such power motor, an electrical differential control unit for each power motor having two reactive elements one of which is capable of generating a rotating field of angular velocity proportionate to a supplied current frequency, and the other of which reactive elements has definite magnetic poles of angular position fixed with respect to its physical body, means to journal both said reactive elements for free rotation with respect to each other and with respect to the power motor controlled by such control unit, a positive driving connection between one reactive element and the meter shaft of the corresponding metering means to ensure rotation of said reactive element at speed proportionate to meter shaft speed, a positive actuating connection between the other reactive element and the valve means of said servo-motor, and electrical interconnections between the rotating field reactive elements of all of the control units of power motors to be controlled, substantially as described.

16. In an airplane having a plurality of power motors and variable pitch blade propellers in driving connection with said motors, together with throttle means to control supply of motive fluid to said power motors, and servo-motor means to vary the pitch of the blades of each such propeller including hydraulic blade shifting means and valve means in conjunction therewith effectively to cause shifting of the blade pitches to positions definitely corresponding to positions of said valve means and to cause locking of the blades in such positions harmoniously with said valve movements; means to control and synchronize said power motors for power comprising metering means for each power motor to meter fuel supplied thereto, and having a shaft rotatable at rate proportionate to the rate of fuel delivery to such power motor, an electrical differential control unit for each power motor having two reactive elements one of which is capable of generating a rotating field of angular velocity proportionate to a supplied current frequency, and the other of which reactive elements has definite magnetic poles of angular position fixed with respect to its physical body, means to journal both said reactive elements for free rotation with respect to each other and with respect to the power motor controlled by such control unit, a positive driving connection between one reactive element and the meter shaft of the corresponding metering means to ensure rotation of said reactive element at speed proportionate to meter shaft speed, a positive actuating connection between the other reactive element and the valve means of said servo-motor, and connections and switching means under control of the operator effective to determine interconnections between the rotating field elements of selected control units, substantially as described.

17. In an airplane having a plurality of power motors and variable pitch blade propellers in driving connection with said motors, together with throttle means to control supply of motive fluid to said power motors, and servo-motor means to vary the pitch of the blades of each such propeller including hydraulic blade shifting means and valve means in conjunction therewith effectively to cause shifting of the blade pitches to positions definitely corresponding to positions of said valve means and to cause locking of the blades in such positions harmoniously with said valve movements; means to control and synchronize said power motors for power comprising metering means for each power motor to meter fuel supplied thereto, and having a shaft rotatable at rate proportionate to the rate of fuel delivery to such power motor, an electrical differential control unit for each power motor having two reactive elements one of which is capable of generating a rotating field of angular velocity proportionate to a supplied current frequency, and the other of which reactive elements has definite magnetic poles of angular position fixed with respect to its physical body, means to journal both said reactive elements for free rotation with respect to each other and with respect to the power motor controlled by such control unit, a positive driving connection between one reactive element and the meter shaft of the corresponding metering means to ensure rotation of said reactive element at speed proportionate to meter shaft speed, a positive actuating connection between the other reactive element and the valve means of said servo-motor, and manual control means to control the valve means for each servo-motor pitch varying means of each power motor propeller independently of operation of said electrical differential unit for such power motor, substantially as described.

18. In an airplane having a plurality of power motors and variable pitch blade propellers in driving connection with said motors, together with throttle means to control supply of motive fluid to said power motors, and servo-motor means to vary the pitch of the blades of each such propeller including hydraulic blade shifting means and valve means in conjunction therewith effectively to cause shifting of the blade pitches to positions definitely corresponding to positions of said valve means and to cause locking of the blades in such positions harmoniously with said valve movements; means to control and synchronize said power motors for power comprising metering means for each power motor to meter fuel supplied thereto, and having a shaft rotatable at rate proportionate to the rate of fuel delivery to such power motor, a differential control unit for each power motor having two elements both mounted for free rotation with respect to each other and with respect to the power motor controlled by such control unit, a positive driving connection between one of said elements and the meter shaft of the corresponding metering means to ensure rotation of said element at speed proportionate to meter shaft speed, a positive actuating connection between the other element and the valve means of said blade varying means of said servo-motor, effective to ensure valve means movement at all times directly proportionate to rotary movement of said element in its journals, together with means to establish a rotary reaction between said elements at a controlled speed, whereby valve movement is directly proportionate at all times to the differential between the speed of the element driven by the meter shaft and the controlled speed, and whereby as synchronism between the controlled speed and the proportionate meter shaft speed is approached the rate of valve movement diminishes progressively until exact synchronism between said controlled speed and the proportionate meter shaft speed is attained, substantially as described.

19. The combination with an internal combustion engine having a liquid fuel connection and having a fuel supply throttle, of means to meter power of said engine comprising a liquid meter having an element which moves at speed proportionate to rate of fuel supplied to said engine, a fuel supply connection to said meter, a fuel delivery connection from said meter to the fuel supply connection of the engine, means visible to the operator to show engine power developed based on the speed of movement of said element, and means to control throttle movement as a function of the speed of movement of said liquid meter, substantially as described.

20. The combination with an internal combustion engine having a fuel supply connection and having a fuel supply throttle, of means to meter power of said engine comprising a meter having a fuel supply connection and a fuel delivery connection to the fuel supply connection of the engine, and also having an element which moves at speed based on rate of fuel supplied to said engine, and means visible to the operator to show engine power developed based on the speed of movement of said element, and means to control throttle movement as a function of the speed of movement of said meter, substantially as described.

21. In an airplane having a power motor together with a fuel supply conduit for said motor, a main throttle, and a pilot throttle in connection with said conduit for control of fuel delivery therethrough, of reversible power actuated means to shift said main throttle for control of rate of fuel delivery by said main throttle to said power motor, said reversible power actuated means including control terminals, second power actuated means to shift said pilot throttle for control of rate of fuel delivery by said pilot throttle to said power motor, means for delivery of power to said second power actuated means for pilot throttle movement, stops to limit movement of said pilot throttle in opening and closing directions, and operating connections between said stops and the control terminals of the main throttle power actuated means whereby when the pilot throttle is moved to position limited by either stop the main throttle power actuating means functions in direction corresponding to the stop which limits movement of the pilot throttle as aforesaid, substantially as described.

22. Means as defined in claim 21, wherein said power actuated means comprises an electric motor, substantially as described.

23. Means as defined in claim 21, wherein said power actuated means comprises an electric motor, together with means to supply current to said motor under control of a synchronizing means, substantially as described.

24. In an airplane having a plurality of power motors having shafts, each of which power motors is provided with a throttle and with a variable pitch blade propeller and with means to vary the blade pitch thereof, means to control and synchronize speed and power of said power motors, comprising an electro-magnetic differential device for the throttle and another electro-magnetic differential device for the variable pitch blade propeller of each power motor, each such electro-magnetic differential device including two reactive elements, one of which is a polyphase element, and the other of which is a magnetic element reacting with such polyphase element, means to meter fuel as delivered to each power motor under control of the throttle of such motor, means to drivingly connect one reactive element of the differential device for the throttle of each power motor to the power shaft of such power motor and means to connect the other reactive element of such differential device to the throttle of such power motor, means to drivingly connect one reactive element of the differential device for the propeller of each power motor to the fuel metering means for such power motor and means to connect the other reactive element of such differential device to the variable pitch blade control means of the propeller of such power motor, means to generate two sets of polyphase pilot control currents, one for speed control and the other for power control, means to connect the polyphase elements of the differential devices for selected power motor throttles to one set of polyphase pilot control currents, means to connect the polyphase elements of the differential devices for selected power motor variable pitch blade control means to the other set of polyphase pilot control currents, and means under control of the pilot of the plane to control frequency of each of said sets of polyphase pilot control currents, according to speed and power as selected by the pilot of the plane, substantially as described.

25. In an airplane having a plurality of power motors having shafts, each of which power motors is provided with a throttle and with a variable pitch blade propeller and with means to vary the blade pitch thereof, means to control and synchronize speed and power of said power motors, comprising an electro-magnetic differential device for the throttle and another electro-magnetic differential device for the variable pitch blade propeller of each power motor, each such electro-magnetic differential device including two reactive elements, one of which is a polyphase element, and the other of which is a magnetic element reacting with such polyphase element, means to meter fuel as delivered to each power motor under control of the throttle of such motor, means to drivingly connect one reactive element of the differential device for the variable pitch blade propeller of each power motor to the power shaft of such power motor and means to connect the other reactive element of such differential device to the variable pitch blade control means of the propeller of such power motor, means to drivingly connect one reactive element of the differential device for the throttle of each power motor to the fuel metering means for such power motor and means to connect the other reactive element of such differential device to the throttle of such power motor, means to generate two sets of polyphase pilot control currents, one for speed control and the other for power control, means to connect the polyphase elements of the differential devices for selected power motor throttles to one set of polyphase pilot control currents, means to connect the polyphase elements of the differential devices for selected power motor variable pitch blade control means to the other set of polyphase pilot control currents, and means under control of the pilot of the plane to control frequency of each of said sets of polyphase pilot control currents, according to speed and power as selected by the pilot of the plane, substantially as described.

THOMAS A. BANNING, Jr.

REFERENCES CITED

The following references are of record in the file of this patent:

UNITED STATES PATENTS

| Number | Name | Date |
|---|---|---|
| 560,006 | Patin et al. | May 12, 1896 |
| 931,274 | Connet | Aug. 17, 1909 |
| 1,181,566 | Bowden | May 2, 1916 |
| 1,432,445 | Earl | Oct. 17, 1922 |
| 1,452,221 | Slider | Apr. 17, 1923 |
| 1,550,124 | Thompson | Aug. 18, 1925 |
| 1,621,995 | Moses et al. | Mar. 22, 1927 |
| 1,623,750 | Pingree | Apr. 5, 1927 |
| 1,908,894 | Findley | May 16, 1933 |
| 1,955,754 | Lyon | Apr. 24, 1934 |
| 1,961,350 | Gunsky | June 5, 1934 |
| 2,013,998 | Goldsborough | Sept. 10, 1935 |
| 2,031,192 | Sutherland et al. | Feb. 18, 1936 |
| 2,051,351 | Speed | Aug. 18, 1936 |
| 2,054,908 | Moore | Sept. 22, 1936 |
| 2,058,161 | Lewis et al. | Oct. 20, 1936 |
| 2,066,819 | Berry | Jan. 5, 1937 |
| 2,075,330 | Angell et al. | Mar. 30, 1937 |
| 2,144,429 | Martin | Jan. 17, 1939 |
| 2,153,470 | McNeil | Apr. 4, 1939 |
| 2,172,678 | Heftler | Sept. 12, 1939 |
| 2,177,908 | Muselier | Oct. 31, 1939 |
| 2,205,264 | Kalin | June 18, 1940 |
| 2,217,856 | Brady | Oct. 15, 1940 |
| 2,221,943 | Fischer | Nov. 19, 1940 |
| 2,246,516 | Herzog | June 24, 1941 |
| 2,248,090 | Kittler | July 8, 1941 |
| 2,251,388 | Bates | Aug. 5, 1941 |
| 2,252,518 | Martin | Aug. 12, 1941 |
| 2,258,462 | Martin | Oct. 7, 1941 |
| 2,261,145 | Dickey | Nov. 4, 1941 |
| 2,272,678 | Morris et al. | Feb. 10, 1942 |
| 2,280,654 | Mader | Apr. 21, 1942 |
| 2,287,794 | Gunn | June 30, 1942 |
| 2,302,042 | Martin | Nov. 17, 1942 |
| 2,314,610 | Day | Mar. 23, 1943 |
| 2,321,024 | Hammond | June 8, 1943 |
| 2,321,025 | Hammond | June 8, 1943 |
| 2,322,303 | Martin | June 22, 1943 |
| 2,330,070 | Martin et al. | Sept. 21, 1943 |
| 2,403,243 | Seppeler | July 2, 1946 |

FOREIGN PATENTS

| Number | Country | Date |
|---|---|---|
| 360,956 | Italy | July 9, 1938 |